United States Patent
Shinada et al.

(10) Patent No.: US 7,020,544 B2
(45) Date of Patent: Mar. 28, 2006

(54) VEHICLE INFORMATION PROCESSING DEVICE, VEHICLE, AND VEHICLE INFORMATION PROCESSING METHOD

(75) Inventors: Akira Shinada, Tokyo (JP); Mikio Kamada, Kanagawa (JP); Ippei Tambata, Kanagawa (JP); Katsuhiko Nunokawa, Aichi (JP); Hiroaki Okajima, Chiba (JP); Kazuya Sasaki, Toyota (JP); Goro Asai, Toyota (JP); Masafumi Kizu, Toyota (JP)

(73) Assignees: Sony Corporation, Tokyo (JP); Toyota Jidosha Kabushiki Kaisha, Toyota (JP)

( * ) Notice: Subject to any disclaimer, the term of this patent is extended or adjusted under 35 U.S.C. 154(b) by 512 days.

(21) Appl. No.: 10/231,251

(22) Filed: Aug. 30, 2002

(65) Prior Publication Data

US 2003/0060937 A1 Mar. 27, 2003

(30) Foreign Application Priority Data

Aug. 31, 2001 (JP) ........................................ 2001-262730

(51) Int. Cl.
*G06F 7/00* (2006.01)

(52) U.S. Cl. ............................................................ 701/1
(58) Field of Classification Search ..................... 781/1; 766/5, 62
See application file for complete search history.

(56) References Cited

U.S. PATENT DOCUMENTS 6,249,780 B1 * 6/2001 Mizokawa .................... 706/23

FOREIGN PATENT DOCUMENTS

JP          11064009 A    *   3/1999

\* cited by examiner

*Primary Examiner*—Y. Beaulieu
(74) *Attorney, Agent, or Firm*—Oblon, Spivak, McClelland, Maier & Neustadt, P.C.

(57) ABSTRACT

An in-vehicle device, a vehicle, and a vehicle information processing method, which are used, for example, to assist in driving an automobile and can properly communicate a vehicle situation to a driver. Methods and mechanisms express user's handling of the vehicle by virtual feelings on the assumption that the vehicle has a personality, and displays the virtual feelings by facial expressions of a predetermined character.

14 Claims, 29 Drawing Sheets

VEHICLE INFORMATION PROCESSING DEVICE, VEHICLE, AND VEHICLE INFORMATION PROCESSING METHOD

BACKGROUND OF THE INVENTION

1. Field of the Invention

This invention relates to a vehicle information processing device, a vehicle, and a vehicle information processing method, which can be used for assisting in driving an automobile.

2. Description of the Related Art

There have been proposed various methods for detecting various situations of vehicles and communicating detection results to prevent accidents.

Vehicles are configured such that a driver can handle freely, while the driver sometimes finds it difficult to recognize his/her character, driving habit or driving skill. Thus, the driver sometimes drives inappropriately for surroundings without being aware of it, which may cause accidents. What are difficult for the driver to be aware of include, for example, rapid acceleration, rapid deceleration, abrupt braking that causes the vehicle to pitch forward, a speed appropriate for a width of a road, and tire wear.

Thus, the methods for detecting the vehicle situations and communicating the detection results have been adapted such that a horn sound is issued to communicate a situation where a traveling speed exceeds a certain value and to communicate access to an obstacle closer than a predetermined value, thus providing feedback of the vehicle situation to the driver to prevent accidents.

However, this type of feedback mechanism may give the driver trouble, and sometimes irritate or annoy him/her. Thus, a mechanism for issuing a horn sound when a traveling speed exceeds a certain value is not actually mounted in recent vehicles.

As a method for solving this problem, for example, Japanese Patent Laid-Open No. 8-339446 proposes a method for expressing a driver's condition detected through interaction visually by facial expressions or behaviors of a character. Similarly, Japanese Patent Laid-Open No. 9-102098 proposes a method for communicating various warnings or the like to a driver in a similar manner.

However, these methods have a problem that the vehicle situation cannot be properly communicated to the driver, though the methods can somewhat reduce the driver's trouble.

SUMMARY OF THE INVENTION

In view of the foregoing, an object of this invention is to provide a vehicle information processing, vehicle, and vehicle information processing method capable of properly communicating the vehicle situation to the driver.

The foregoing object and other objects of the invention have been achieved by the provision of a vehicle information processing device mounted in a vehicle, in an aspect according to claim 1, the vehicle information processing device including: a virtual feeling generating means for expressing user's handling of the vehicle, based on operation information and behavior information, by virtual feelings on the assumption that the vehicle has a personality; and a facial expression generating means for displaying the virtual feelings by facial expressions of a predetermined character.

In an aspect according to the invention, there are provided a vehicle including: a virtual feeling generating means for expressing user's handling of the vehicle, based on operation information and behavior information, by virtual feelings on the assumption that the vehicle has a personality; and a facial expression generating means for displaying the virtual feelings by facial expressions of a predetermined character.

In an aspect according to another aspect of the invention, there are provided a vehicle information processing method including: a virtual feeling generating step of expressing user's handling of the vehicle, based on operation information and behavior information, by virtual feelings on the assumption that the vehicle has a personality; and a facial expression generating step of displaying the virtual feelings by a facial expression of a predetermined character.

The configuration according to yet another aspect o the invention includes the virtual feeling generating means for expressing the user's handling of the vehicle, based on the operation information and the behavior information, by the virtual feelings on the assumption that the vehicle has the personality, and the facial expression generating means for displaying the virtual feelings by the facial expressions of the predetermined character. This allows a driver to feel an attachment to the vehicle compared to a case where warnings are directly issued by messages or the like, and allows proper communication of a vehicle situation to the driver without irritating or annoying him/her.

Thus, the configuration according to the invention can provide a vehicle and a vehicle information processing method capable of properly communicating the vehicle situation to the driver.

According to the invention, the user's handling of the vehicle is displayed by the virtual feelings on the assumption that the vehicle has a personality, and the virtual feelings are displayed by the predetermined character's facial expressions, thus allowing the vehicle situation to be properly communicated to the driver.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 2:
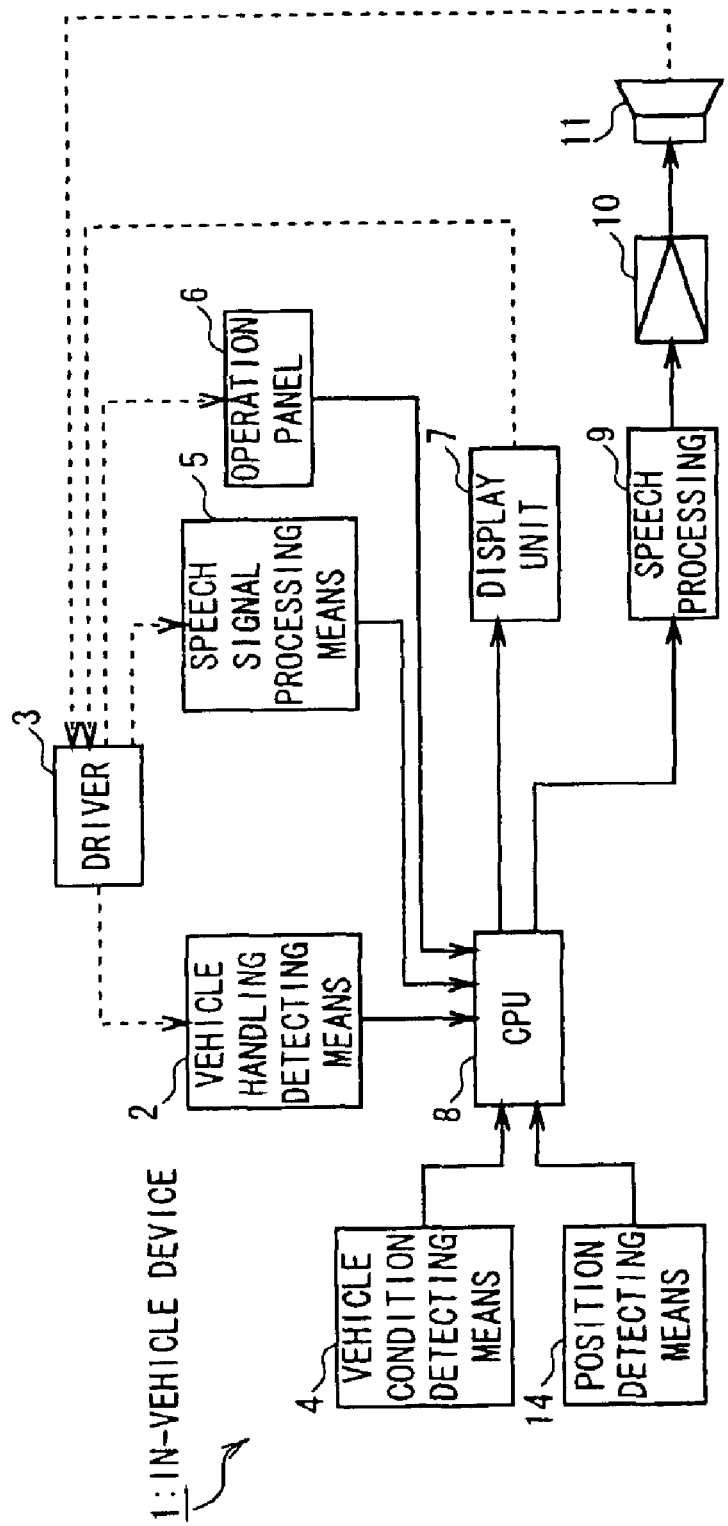
FIG. 2 is a block diagram of an in-vehicle device according to the first embodiment of the invention.

Preferred embodiments of this invention will be described with reference to the accompanying drawings:
(1) First Embodiment
(1-1) A Configuration of the First Embodiment FIG. 2 is a block diagram of an in-vehicle device according to the first embodiment of the invention. The in-vehicle device 1 is mounted in a user's vehicle for use.

In the in-vehicle device 1, vehicle handling detecting means 2 processes output of sensors placed in various operation means used for driving operations to detect vehicle operation by a driver 3 and output detection results as operation information. Specifically, the vehicle handling detecting means 2 detects opening of an accelerator pedal as an accelerating operation by the driver, an operation amount of a brake pedal as a braking operation, presence or absence of stop lamp flashing, a parking brake operation, a steering angle as a steering wheel operation, a shift position as a shift lever operation, operations of a light, a winker, a wiper, a window, a horn, or the like to output detection results. Thus, the in-vehicle device 1 can detect various operations of the driver 3.

Vehicle condition detecting means 4 processes output signals of the various sensors placed in the vehicle to detect various vehicle conditions to output detection results as behavior information. Specifically, the vehicle condition detecting means 4 detects and outputs engine RPM, a rotation speed of a wheel, a vehicle speed, anteroposterior acceleration, lateral acceleration, vertical acceleration, yaw rate, roll rate, pitch rate, fuel consumption amount, or the like. Thus, the in-vehicle device 1 can detect various conditions of the vehicle.

Speech signal processing means 5 receives speech of the driver 3 through a microphone, and performs speech recognition processing to output by controlling a central processing unit (CPU) 8. Thus, the in-vehicle device 1 is capable of speech instruction to switch behaviors.

An operation panel 6 is formed by a touch panel, and is placed on a display unit 7 placed at each seat in this vehicle. Thus, the in-vehicle device 1 is capable of instruction to switch behaviors for each rider on each seat by operating the operation panel 6. A display unit 7 displays various images by controlling the central processing unit (CPU) 8.

A speech processing circuit 9 decodes and outputs audio data held by predetermined recording means by controlling the central processing unit 8, or performs speech synthesis of various speeches to output. An amplification circuit 10 amplifies speech signals output from the speech processing circuit 9 to drive a speaker 11. Thus, the in-vehicle device 1 allows the user to enjoy various visual and audio contents recorded in unshown recording means by the display unit 7 and the speaker 11, and can provide the user with various kinds of audio and visual information.

Position detecting means 14 is configured by, for example, a Global Positioning System (GPS) receiving device that is part of a car navigation system, and detects vehicle's current position to output detection results.

The central processing unit 8 is a controller for controlling the entire behaviors of the in-vehicle device 1, and processes various detection results detected by the vehicle handling detecting means 2 and the vehicle condition detecting means 4 by the user's instruction detected via the operation panel 6 and the speech signal processing means 5. In this processing, the central processing unit 8 personifies the vehicle, generates a visual feeling about driver's handling of the vehicle, and communicate the virtual feeling to the user. When receiving user's instruction to direct in information communication by the virtual feeling, the central processing unit 8 processes current position information detected by position detecting means 14 and performs corresponding processing.

Specifically, when the driver 3 drives violently, it can be foreseen that the vehicle feels uncomfortable if the vehicle has feelings. In such a case, an angry, sad or tired expression is provided to a rider as the vehicle's virtual feeling. On the other hand, when the driver 3 drives gently and calmly, it can be projected that the vehicle feels comfortable in its virtual feelings, thereby providing a pleased or cheerful expression to the rider.

Neumann type computers are not good at processing of pseudo feeling expressions, and generally require large-scale processing. Thus, the central processing unit 8 expresses feelings such as anger or pleasure by two parameters of a feeling level and a physical fitness level. Therefore, the central processing unit 8 expresses the feelings by simplified processing. In this embodiment, when the driver 3 drives violently, it is projected that the vehicle feels uncomfortable, and the angry, sad or tired expression is selected as the vehicle's virtual feeling. On the other hand, when the driver 3 drives gently and calmly, it is projected that the vehicle feels comfortable in its virtual feelings, and the pleased or cheerful expression is selected. Such pseudo feeling expressions are the personified vehicle's emotional expressions about the driver's operations.

The feeling level is the vehicle's virtual feeling converted into numbers, and indicates ease in driving, in other words, a degree of haste of the driver by the above described assumption. Specifically, the central processing unit 8 calculates the feeling level for each unit driving time by a basic equation expressed by feeling level=(constant×driving time) ÷(G variation×rapid operation×sudden behavior×necessary or unnecessary behavior).

The driving time in this equation is a driving time used for detecting the feeling level for each unit driving time, and not only a time when an engine is activated, but also a time after the rider releases the door lock and rides the vehicle and before the rider gets off and locks the door is divided into predetermined intervals and assigned to the driving time in the equation. The G variation is acceleration in various directions detected by the vehicle condition detecting means 4, and used for calculating the feeling level with acceleration in each direction converted to an absolute value and normalized by a standard value recorded in an unshown memory. The rapid operation is a rapid operation detected by operation information of a steering wheel or the like detected by the vehicle handling detecting means 2, and normalized by a standard value recorded in the memory and used for calculating the feeling level with the operation. The sudden behavior is a sudden operation of the brake or the like similarly detected by the vehicle handling detecting means 2, and after a differential value of the operation amount is calculated, normalized by a standard value recorded in the memory and used for calculating the feeling level.

The necessary or unnecessary behavior is information for determining appropriateness of driver's operation, and used for calculating the feeling level with wiper operation information relative to detection results of rainfall by an external sensor converted into numbers. Specifically, for example, when the wiper is operated even though the external sensor does not detect rainfall, a low value is assigned to the necessary or unnecessary behavior. If a speed of the wiper is inappropriate for drizzling rain such as when the wiper is set to high speed in drizzle, or when the wiper is set to low speed in hard rain, a value in accordance with the appropriateness is assigned to the necessary or unnecessary behavior.

A low value is assigned to the necessary or unnecessary behavior also when a door switch is turned off by closing the door after the car starts, and when the car starts before detection of fitting of a seat belt. On the other hand, a high value is assigned to the necessary or unnecessary behavior when a series of operations relating to expansive safe driving such as when turning off of the door switch by closing the door is detected, and after a certain interval, fitting of the seat belt is detected, and then after a certain interval, the engine is activated.

Thus, the value of the feeling level becomes low in high acceleration or deceleration by sudden start or hard braking, abrupt steering, short door opening/closing time, violently closing the door, or the like, while the feeling level becomes high when various operations are performed smoothly and quietly.

The physical fitness level is the vehicle's physical fitness converted into numbers with the vehicle personified, and determined by reserve capacity of driving. Specifically, the central processing unit 8 calculates the physical fitness level by a basic equation expressed by physical fitness level= constant×{(fuel residue÷full)÷(continuous traveling time÷activating time)}, where fuel residue is residue of fuel, and full is an amount of fuel when full. The continuous traveling time is a driver's continuous driving time, and the central processing unit 8 determines rest time by stops or parking longer than a certain time to calculate the continuous traveling time. The activating time is the time lapsed from a start of driving, including continuous traveling and rest.

Thus, the central processing unit 8 personifies the vehicle, and when the vehicle's hunger is satisfied, and the vehicle has good physical fitness, the physical fitness level is calculated so as to increase the value of the physical fitness level.

Figure 3:
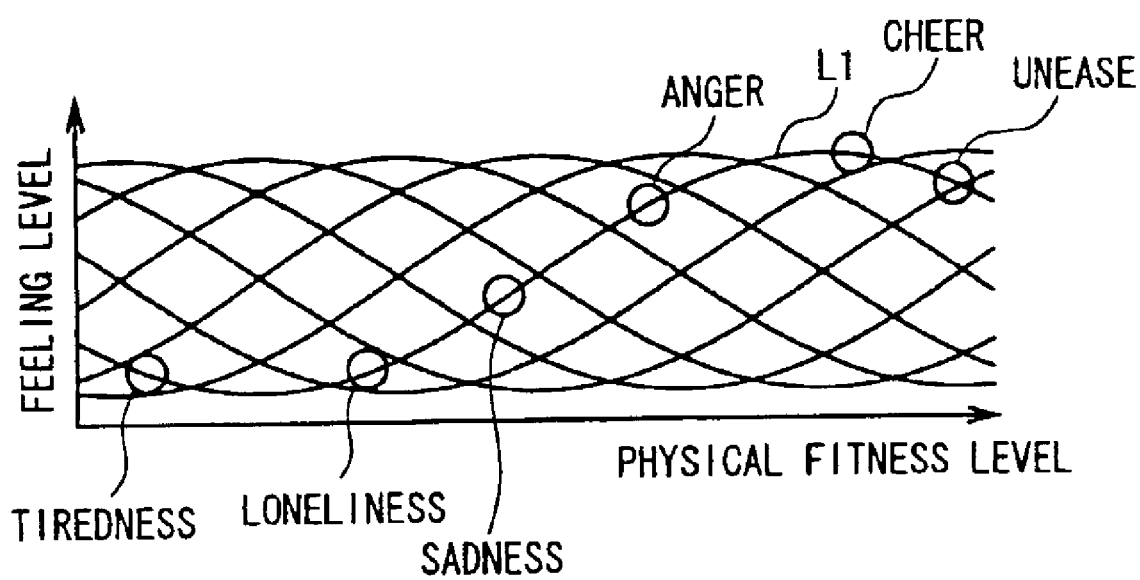
FIG. 3 shows characteristic curves used for explaining a feeling level and a physical fitness level.

The central processing unit 8 assigns these two parameters to sinusoidal characteristic curves shown in FIG. 3 to detect a feeling to be expressed. The plurality of characteristic curves are expressed by a plurality of sinusoidal functions having different phases with the physical fitness level set to the parameter. The central processing unit 8 selects a corresponding characteristic curve from the plurality of characteristic curves depending on the feeling level and the physical fitness level, and successively switches the selected characteristic curve by changes in the physical fitness level. The selected characteristic curves are traced in according with the feeling level to set the feeling to be expressed to loneliness, sadness, anger, and cheer, successively.

Specifically, a characteristic curve L1 in FIG. 3 is selected, and when a value of the feeling level is high, the feeling to be expressed is set to cheer. When the feeling level decreases, the feelings of anger, sadness, and loneliness are successively selected. When the physical fitness level significantly decreases, the feeling to be expressed is set to tired. On the other hand, when the feeling level decreases lower than the cheerful condition in spite of the good physical fitness level, the feeling to be expressed is set to unease.

Figure 1:
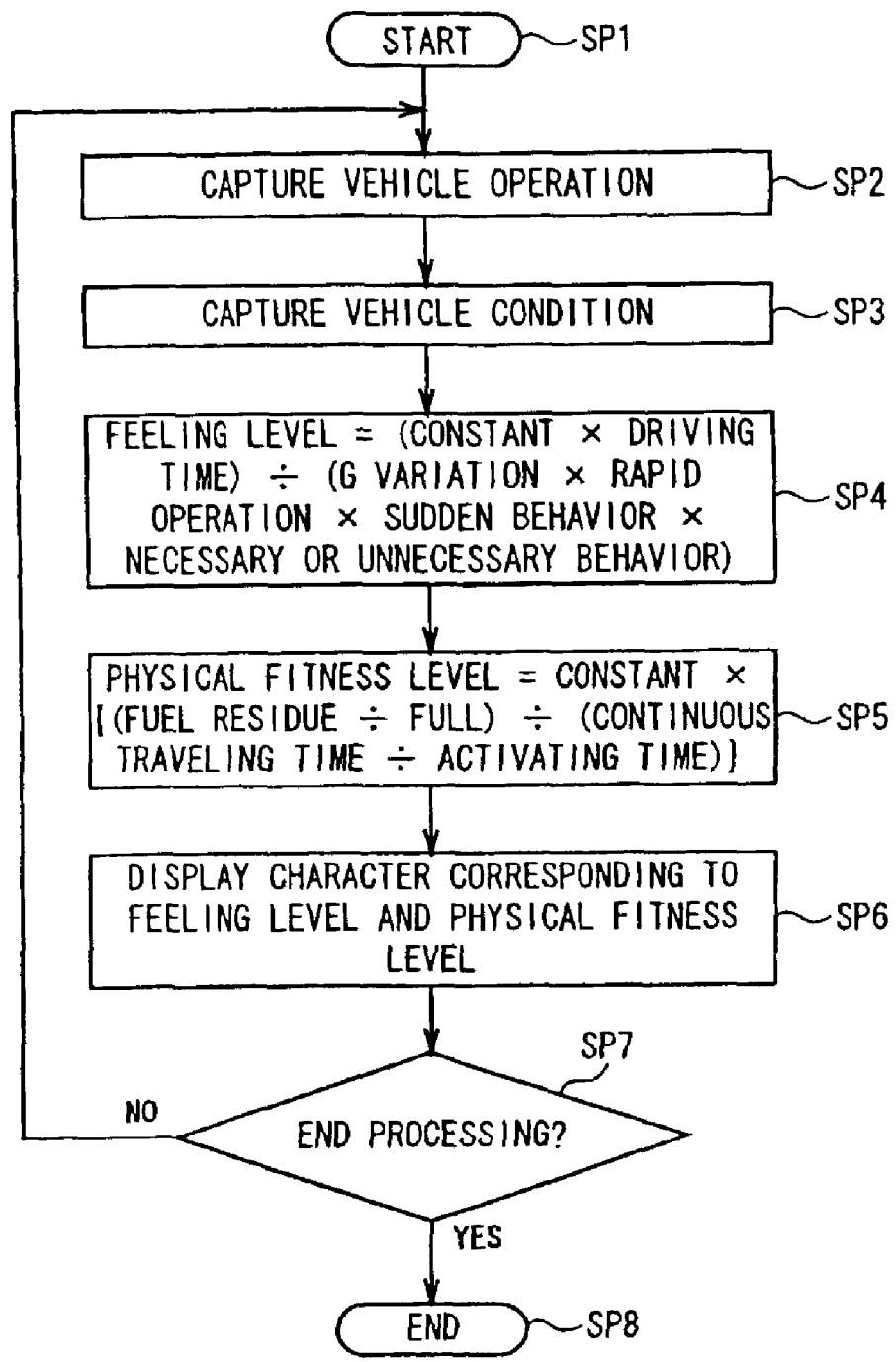
FIG. 1 is a flowchart of a processing procedure of a central processing unit according to a first embodiment of the invention.

FIG. 1 is a flowchart of a processing procedure relating to feeling expression of the central processing unit 8. When the central processing unit 8 receives rider's instruction of a behavior mode of such feeling expression by operating the operation panel 6 and also by processing of the speech signal processing means 5, the central processing unit 8 moves from Step SP1 to Step SP2, captures operation information from the vehicle handling detecting means 2, and in Step SP3, captures various conditions of the vehicles from the vehicle condition detecting means 4. In Step SP4, the feeling level for each unit driving time is detected. In Step SP4, G means Gravity caused by vehicle operation.

In Step SP5, the physical fitness level corresponding to the feeling level detected in Step SP4 is calculated, and in Step SP6, the above described characteristic curves in FIG. 3 are applied to set the feeling to be expressed. Further, the central processing unit 8 displays a character on the display unit 7 in accordance with the set feeling, and moves to Step SP7 to determine whether the user has instructed to end the behavior mode of the feeling expression.

If negative, the central processing unit 8 returns to Step SP2 to repeat the series of processing procedures, while if affirmative in Step SP7, the central processing unit 8 moves to Step SP8 to end the processing procedure.

Concurrently with the series of processing steps, the central processing unit 8 determines the feeling level for each unit driving time detected by the series of processing steps. If the driver drives violently, a surprised feeling is expressed instead of the above described various feeling expressions depending on the driving. Similarly, when the driver drives very well, a feeling of praising the driver for good driving is expressed.

Figure 4:
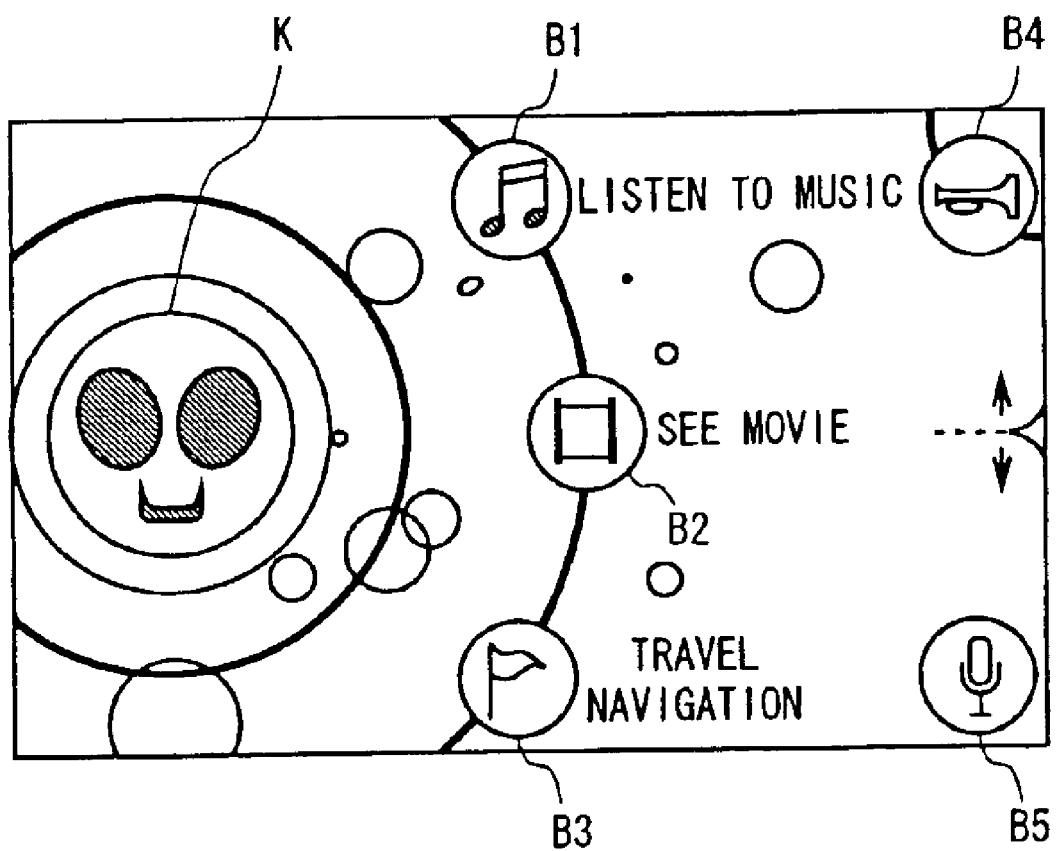
FIG. 4 is a plan view of a basic screen.

FIG. 4 is a plan view of a basic display screen of the display unit 7 thus formed by the central processing unit 8. The display screen is displayed on the display unit 7 at a right seat, and in this embodiment, at a left seat, a display screen is formed symmetrically with respect to the display screen shown in FIG. 4.

In this display screen, a character's face K expressing the vehicle's feeling is displayed on a position closer to a center of the vehicle. In the display screen, the character's face K is displayed in a circular form, and a plurality of arcs are displayed concentrically with the outline of the face. In the display screen, a plurality of buttons B1 to B3 are displayed on the arc substantially at a center of the screen among the plurality of arcs. In FIG. 4, among the plurality of buttons B1 to B3, the uppermost button B1 is a button for opening a music content menu, and has an indication of a musical note. The next button B2 is a button for opening a movie content menu, and has an indication of a movie film. The lowermost button B3 is a button for an information content, and has an indication of a flag. The buttons B1 to B3 have indications "Listen to music", "See movie", "Travel navigation", respectively at their peripheries.

On the other hand, at a top and a bottom opposite to the character's face K, similar buttons B4 and B5 are displayed. The top button B4 is a button for opening an operation menu of issuing a horn sound by inter-vehicle communication, and has an indication of a trumpet. The bottom button B5 is an operation button for activating a function of speech recognition, and has an indication of a microphone. Among the buttons B4 and B5, the button B4 is placed on an arc having a different center from the arc on which the buttons B1 to B3 are placed.

Thus, the central processing unit 8 allows the user to recognize, by displaying the concentric arcs, that items selectable by the buttons B1 to B4 contains lower order selection items. Placing the buttons B1 to B3 and the button B4 on the arcs with different centers allows the user to recognize that the operations are of different types.

In the display screen, the background is divided by the display of each arc, and its color gradually becomes darker from a character side toward a periphery. Further, the circles spread like bubbles coming up with the sizes gradually becoming larger from the center of the screen toward the periphery.

Figure 5:
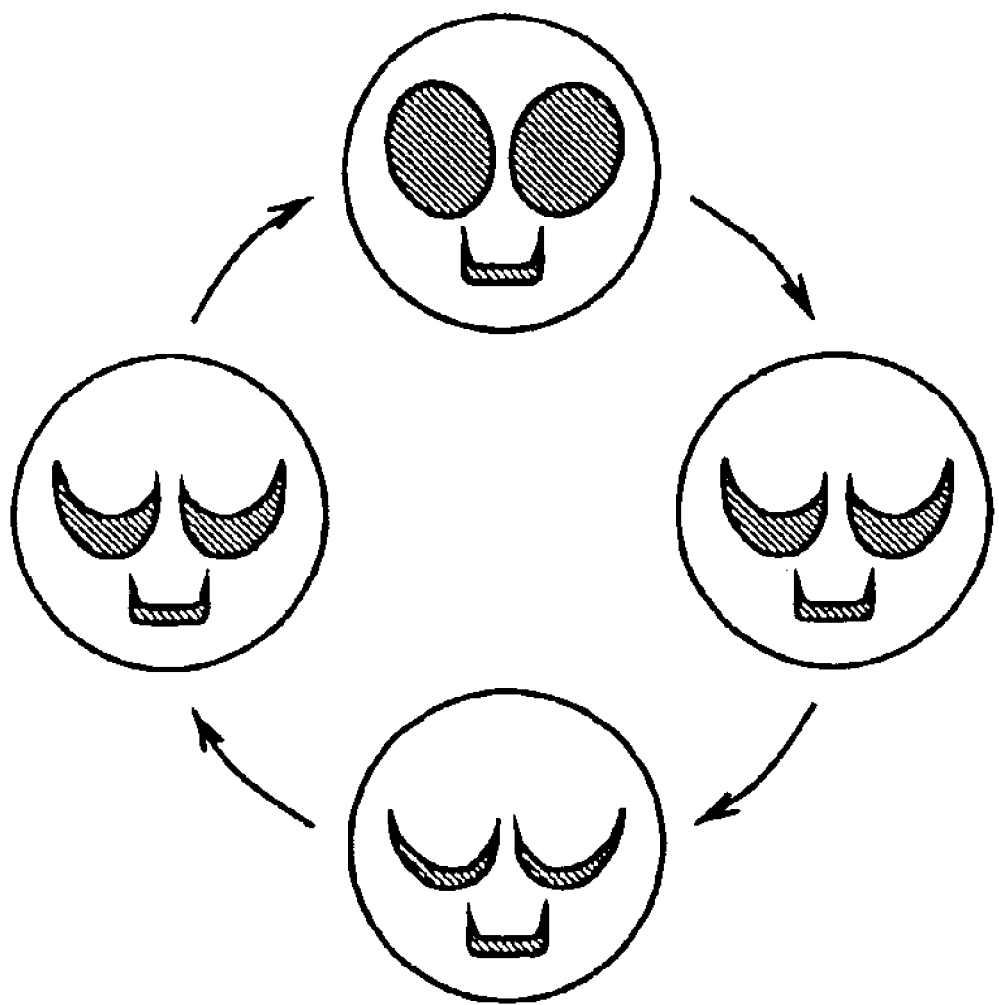
FIG. 5 is a plan view of changes of character's facial expression in a cheerful condition.

The central processing unit 8 displays the vehicle's emotions by the character's facial expressions in the basic display screen thus formed. The central processing unit 8 also changes the color of the background by switching the display. Specifically, the face in FIG. 4 shows the cheerful feeling, and is displayed by animation such that its eyes wink at certain intervals as in FIG. 5 successively showing changes of the display by arrows. When the cheerful feeling is shown, the background color is orange that is a warm color.

Figure 6:
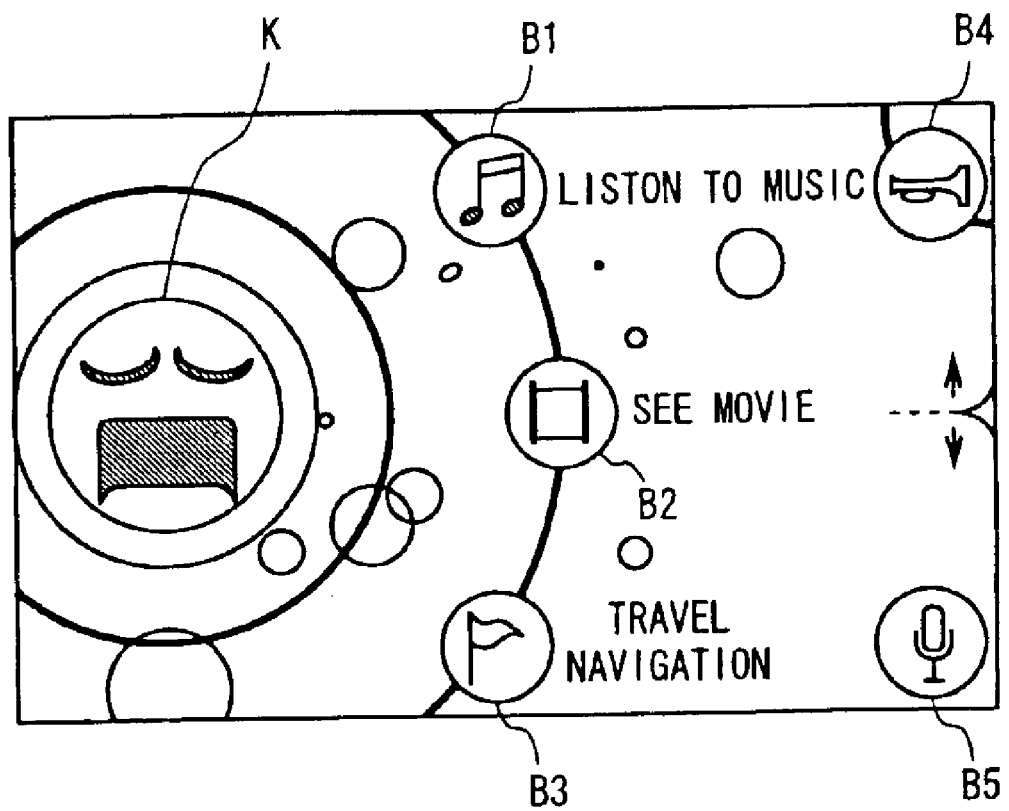
FIG. 6 is a plan view of a basic screen with a tired expression.
Figure 7:
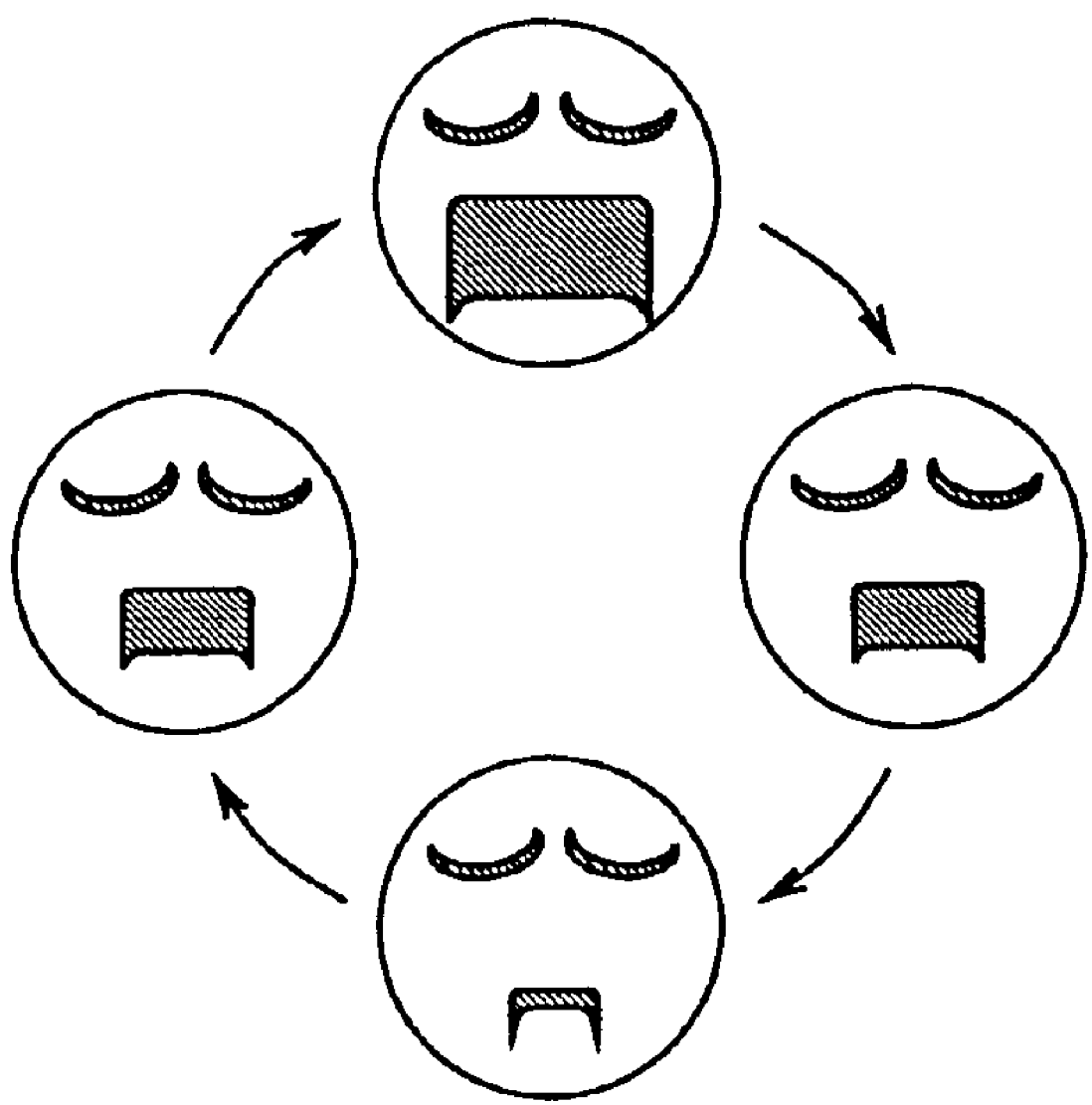
FIG. 7 is a plan view of changes of character's facial expression in a tired condition.

FIG. 6 is a plan view of the tired feeling in contrast with FIG. 4. In this case, as shown in FIG. 7 in contrast with FIG. 5, an animation character yawning at certain intervals is displayed. When the tired feeling is shown, the background color is blue that is a cool color with tinges of orange.

Figure 8:
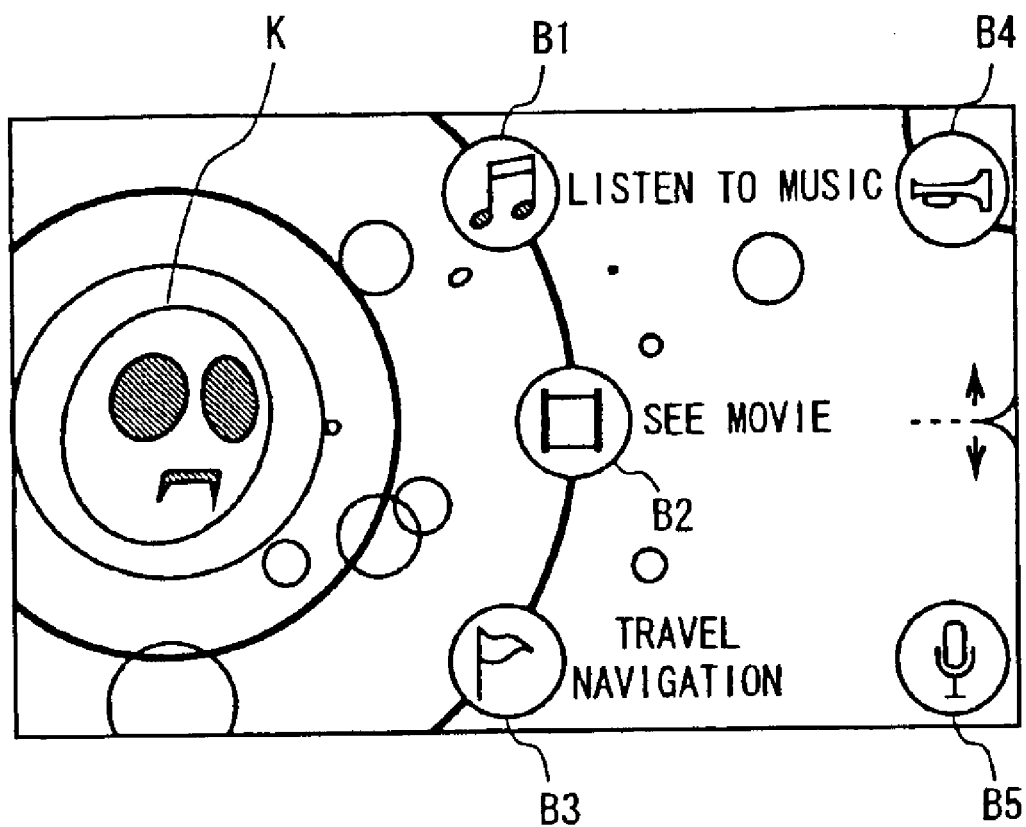
FIG. 8 is a plan view of a basic screen with a lonely expression.
Figure 9:
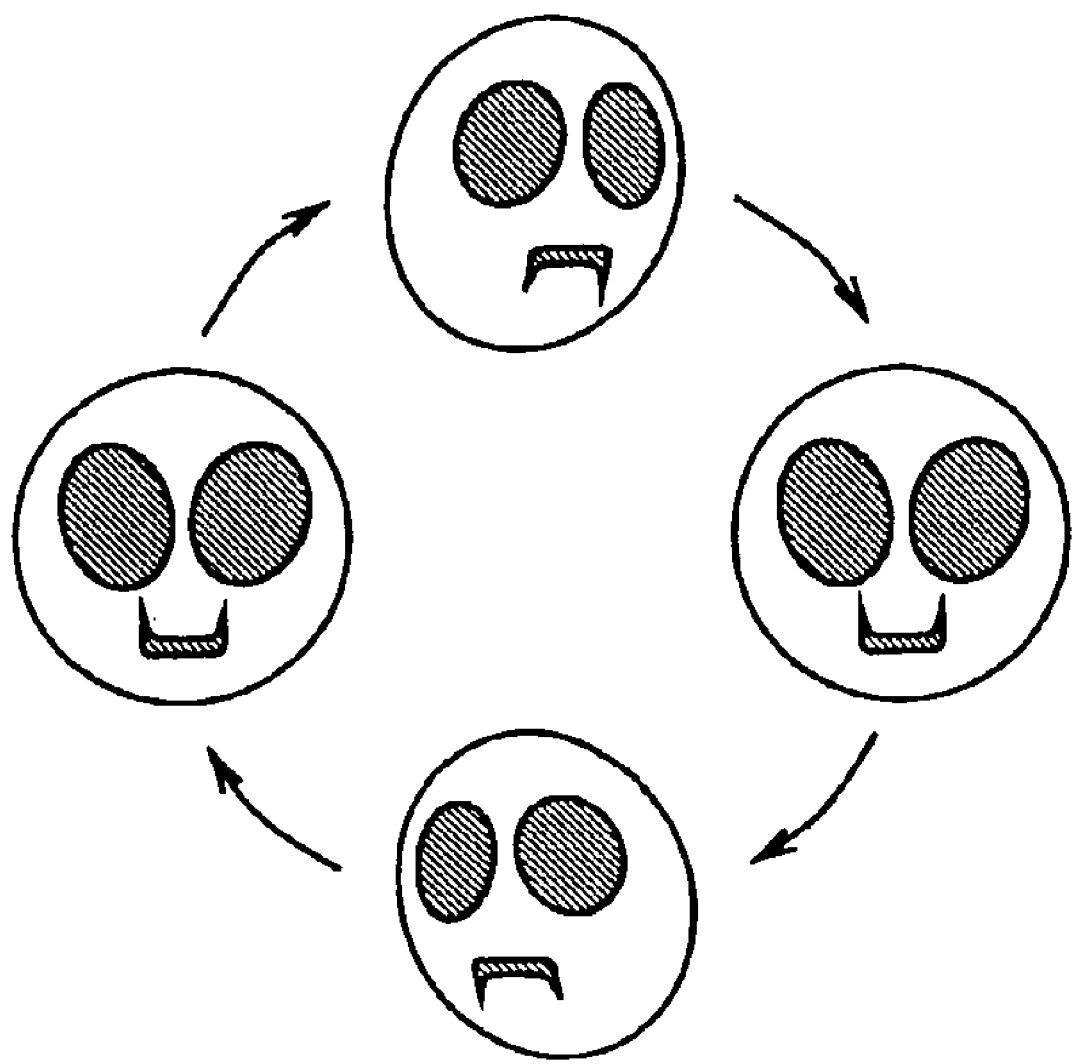
FIG. 9 is a plan view of changes of character's facial expression in a lonely condition.

FIG. 8 is a plan view of the lonely feeling in contrast with FIG. 4. In this case, as shown in FIG. 8 in contrast with FIG. 5, an animation character feeling uneasy with its eyes roving at certain intervals is displayed. When the lonely feeling is shown, the background color is blue.

Figure 10:
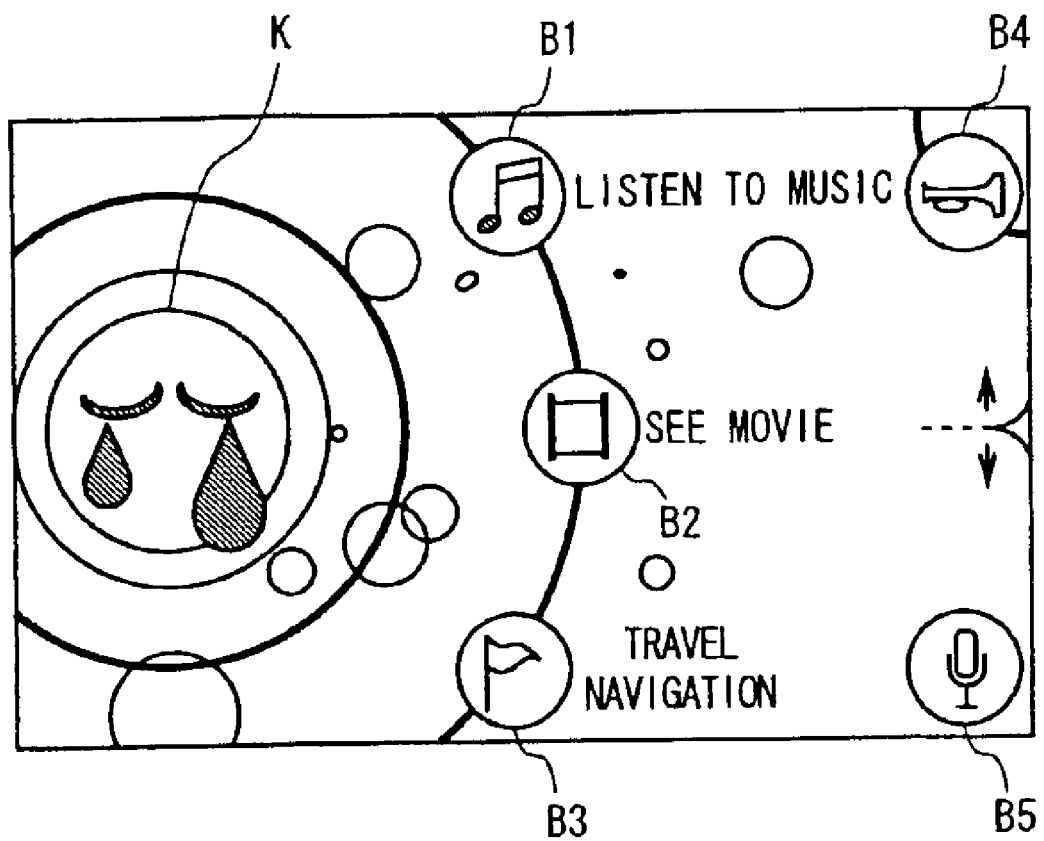
FIG. 10 is a plan view of a basic screen with a sad expression.
Figure 11:
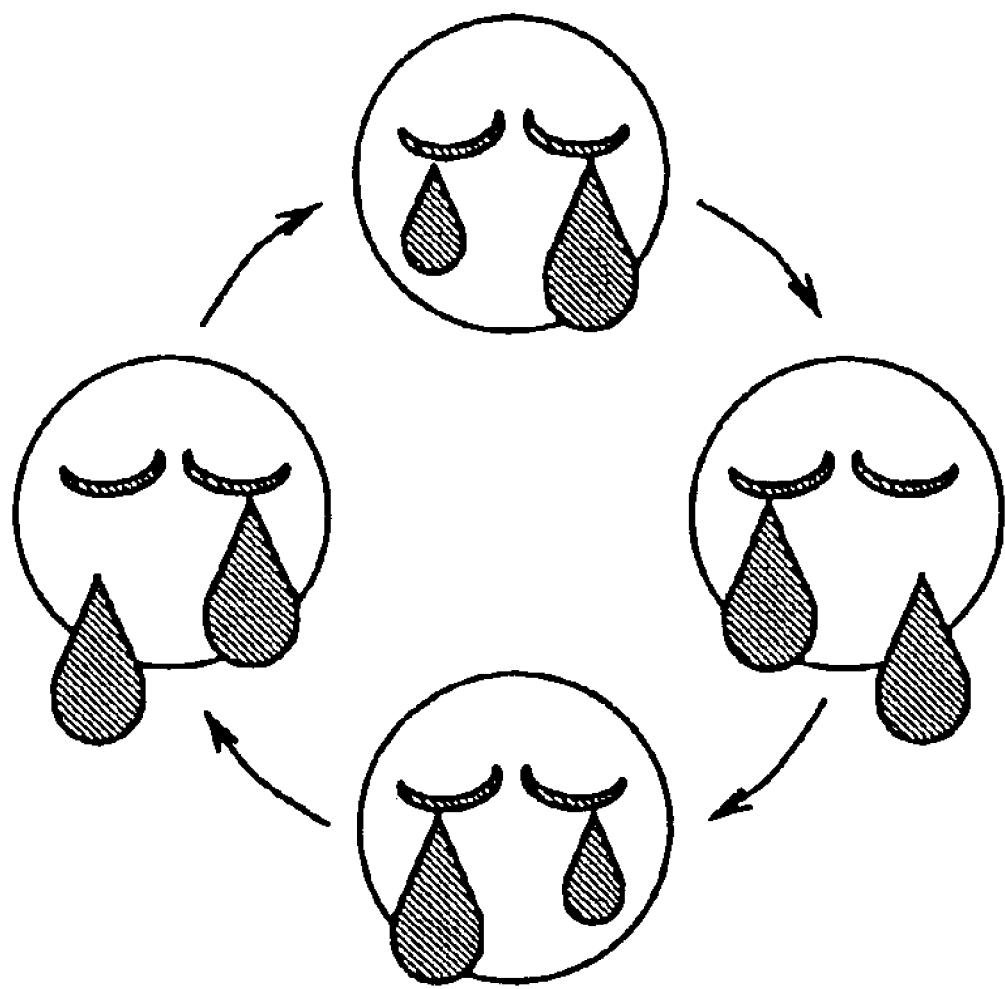
FIG. 11 is a plan view of changes of character's facial expression in a sad condition.

FIG. 10 is a plan view of the sad feeling in contrast with FIG. 4. In this case, as shown in FIG. 11 in contrast with FIG. 5, an animation character shedding tears is displayed. When the sad feeling is shown, the background color is blue.

Figure 12:
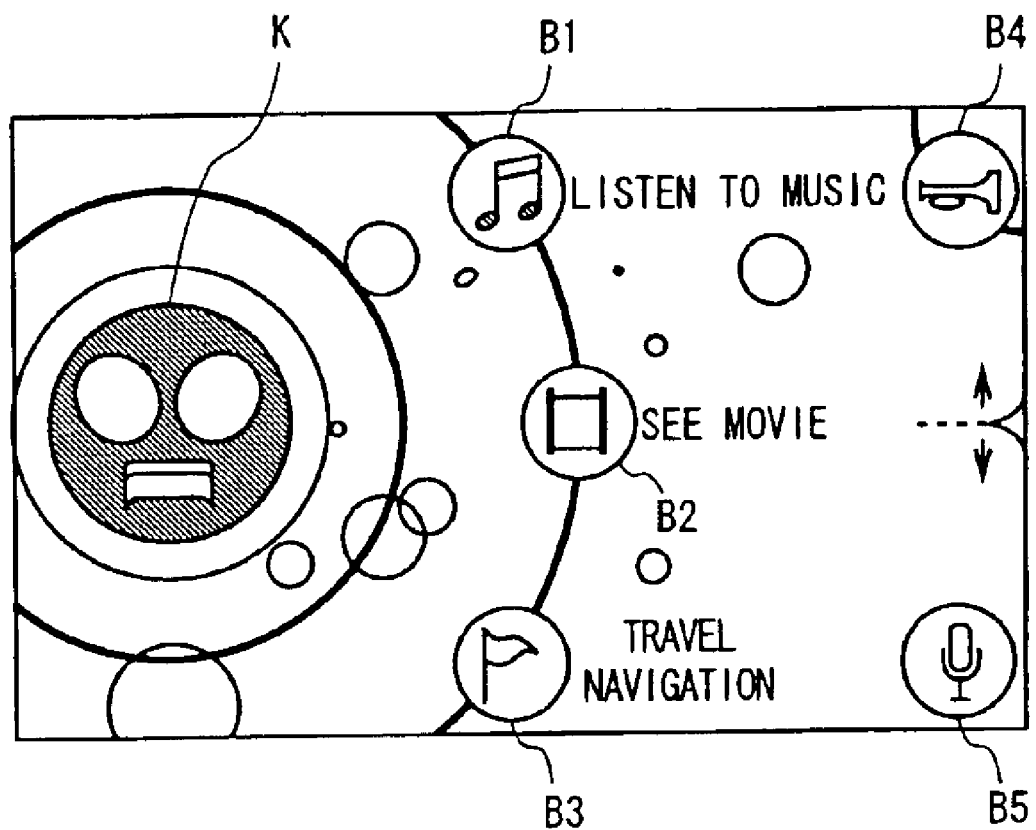
FIG. 12 is a plan view of a basic screen with an angry expression.
Figure 13:
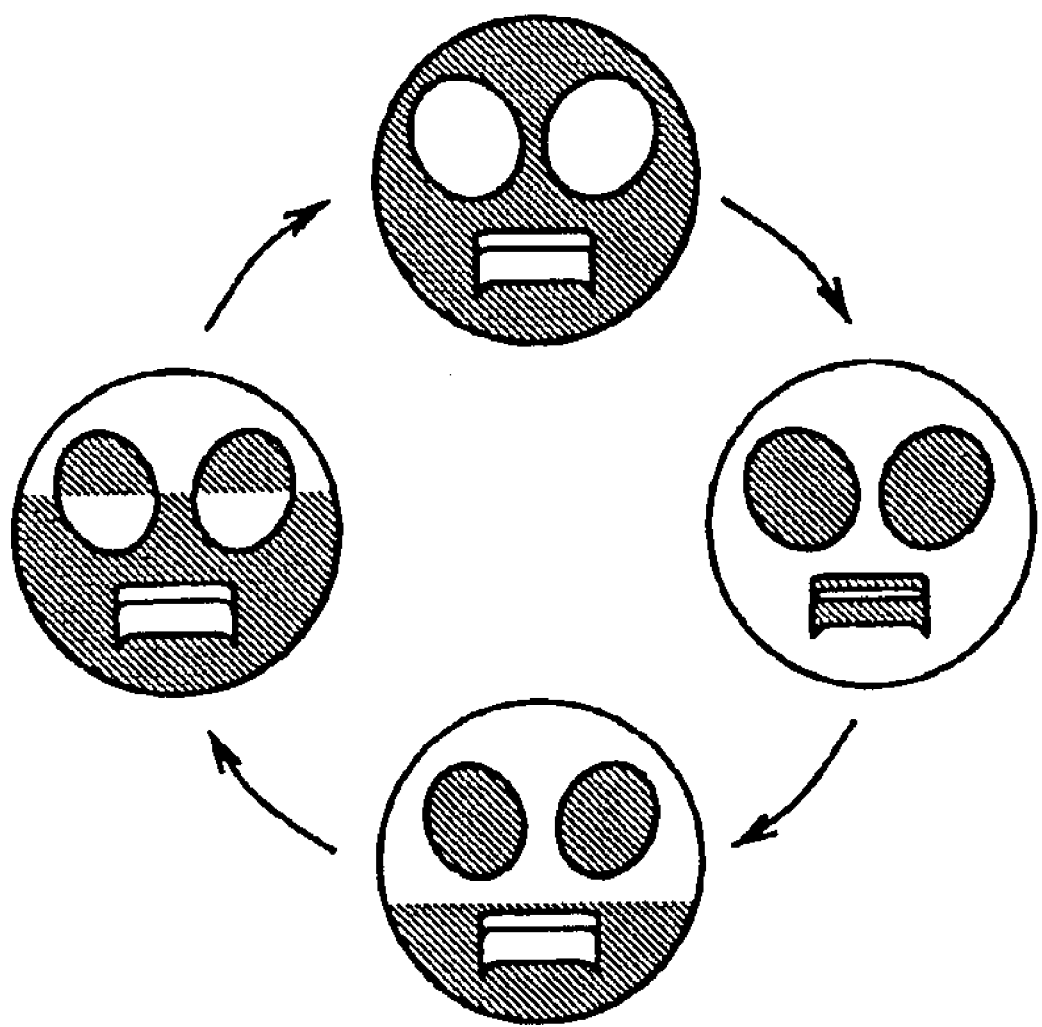
FIG. 13 is a plan view of changes of character's facial expressions in an angry condition.

FIG. 12 is a plan view of the angry feeling in contrast with FIG. 4. In this case, as shown in FIG. 13 in contrast with FIG. 5, an animation character is displayed whose color of the face successively changes to be enlarged from a lower area toward an upper area. When the angry feeling is shown, the background color is red that shows passion.

Figure 14:
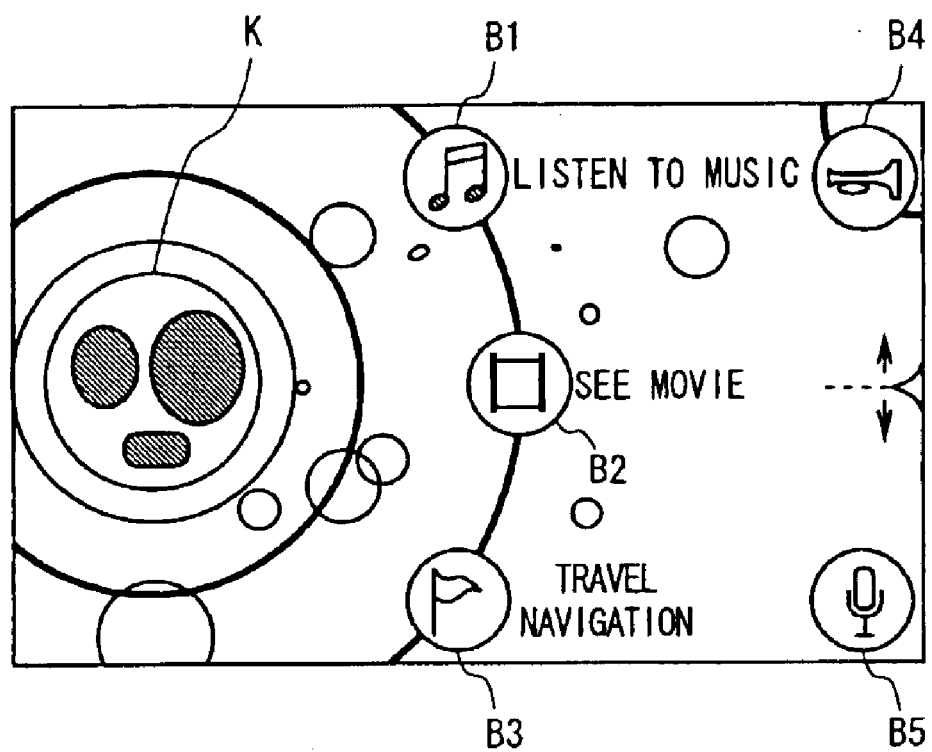
FIG. 14 is a plan view of a basic screen with a surprised expression.
Figure 15:
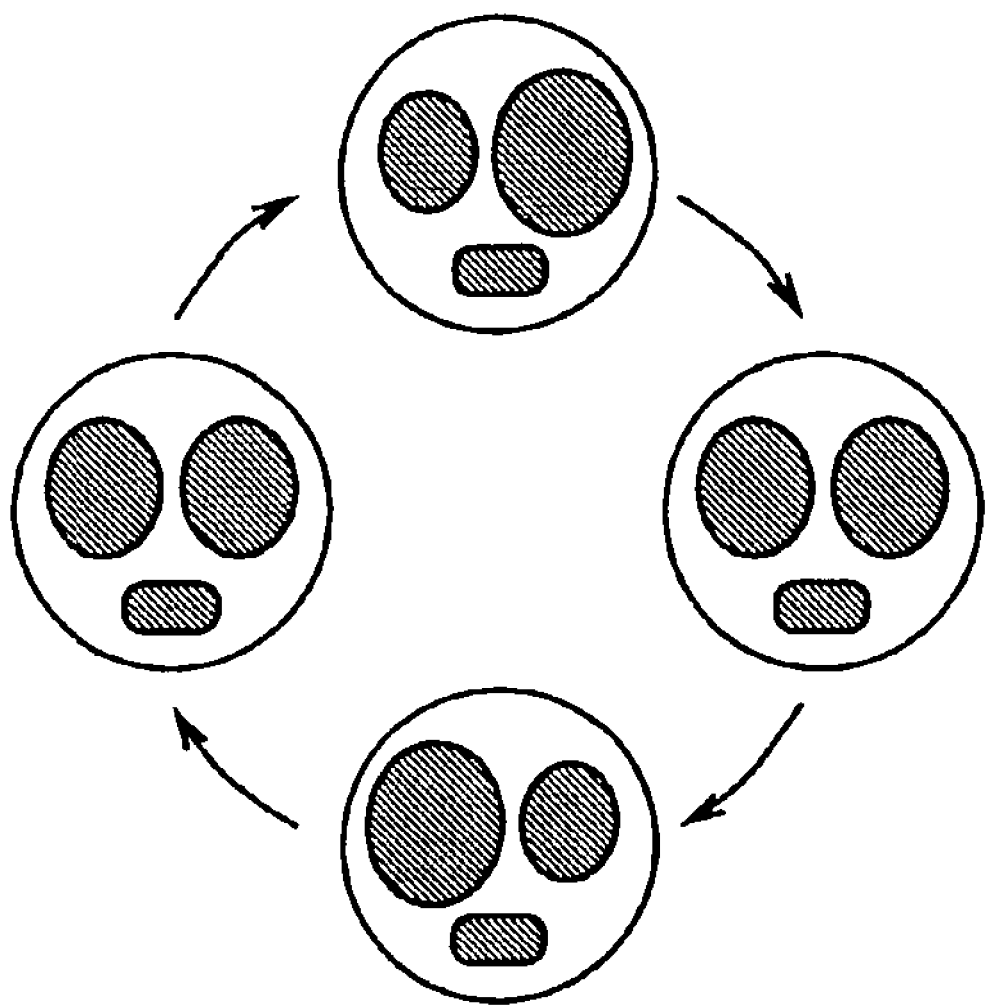
FIG. 15 is a plan view of changes of character's facial expressions in a surprised condition.

FIG. 14 is a plan view of the surprised feeling. In this case, as shown in FIG. 15, an animation character is displayed, each eye alternately becoming large or small with its mouth half opened. When the surprised feeling is shown, the background remains in the intermediate preceding color of sadness or cheer.

Figure 16:
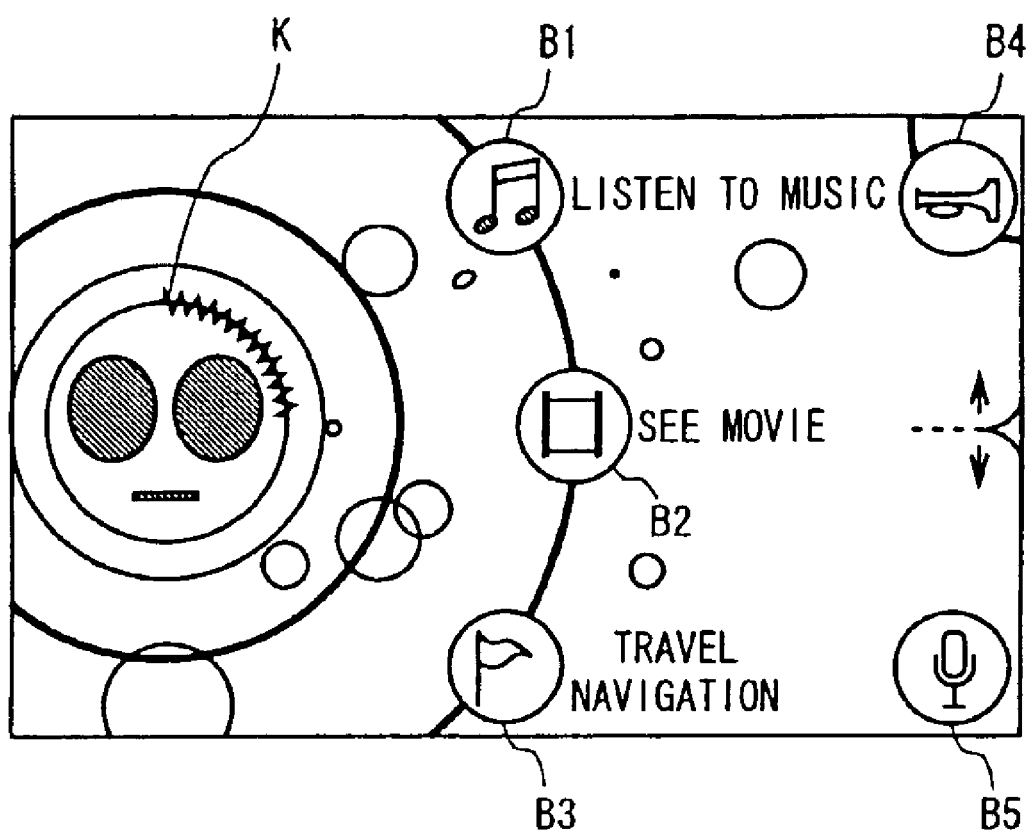
FIG. 16 is a plan view of a basic screen with an uneasy expression.
Figure 17:
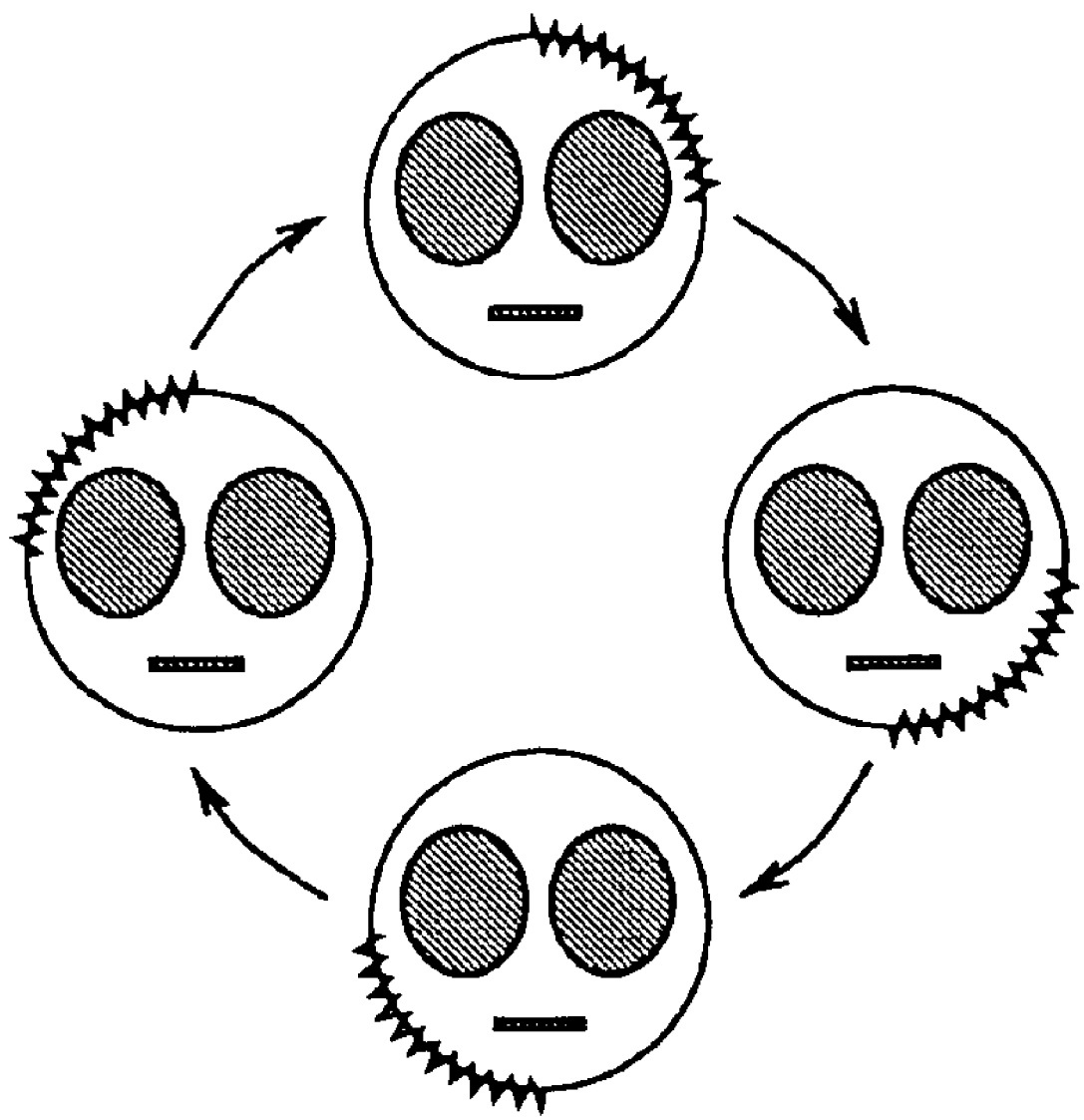
FIG. 17 is a plan view of changes of character's facial expressions in an uneasy condition.

FIG. 16 is a plan view of the uneasy feeling. In this case, as shown in FIG. 17, an animation character is displayed whose outline of the face is partly fuzzed, the fuzzed portion successively moving along the outline. When the uneasy feeling is shown, the background remains in the intermediate preceding color of sadness or cheer.

Figure 18:
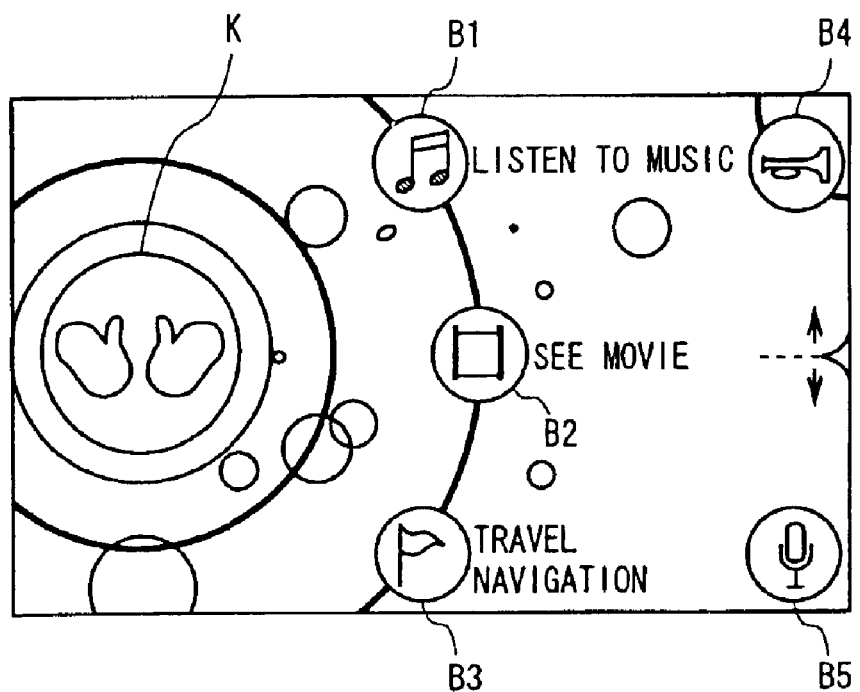
FIG. 18 is a plan view of a condition displaying a feeling of praising a driver for good driving.

FIG. 18 is a plan view of the feeling of praising the driver for good driving. In this case, an animation character of clapping hands is displayed instead of the character's face. In this case, the background color is orange like the cheerful condition.

Figure 19:
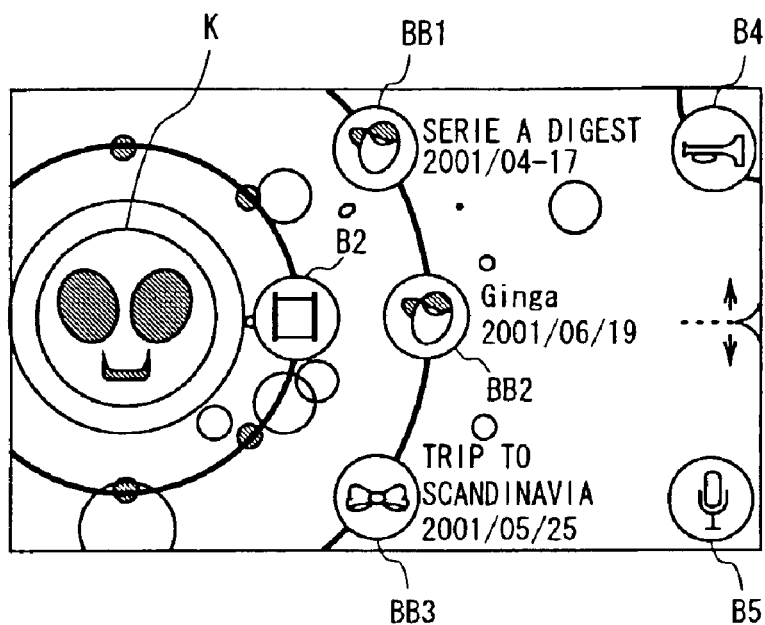
FIG. 19 is a plan view of a menu screen of a movie content.

When the buttons B1 and B2 are operated, the central processing unit 8 makes accesses to unshown recording means to search providable corresponding contents. Further, the central processing unit 8 switches the display of the display unit 7 in accordance with search results. FIG. 19 is a plan view of a display when the button B2 for opening the movie content menu is operated in the basic display screen in FIG. 4. When the button B2 is operated in the basic display screen in FIG. 4, the central processing unit 8 moves the display position of the button B2 onto the inner arc. With the movement of the display position of the button B2, small circles corresponding to the buttons B1 and B3 are displayed on the arc on which the button B2 is displayed.

On the original display position of the buttons B1 to B3, buttons BB1 to BB3 for opening movie contents are displayed. The buttons BB1 to BB3 have indications of symbols, each symbol showing a rider who likes the content, and details of the contents are displayed adjacent to the symbols by text together with dates stored in the in-vehicle device 1. In FIG. 19, a symbol of a human face wearing a cap that suggests a boy is assigned to the buttons BB1, BB2, and a symbol of a ribbon that suggests a girl is assigned to the button BB3.

When the content selection screen is thus displayed, the central processing unit 8 also displays the emotions by the vehicle's virtual feelings as in the basic screen. When the original button B2 whose display position has been switched to the inner side is selected in the content selection screen, the central processing unit 8 returns the display screen in FIG. 19 to the original display screen (FIG. 4).

When any of the buttons BB1 to BB3 for the contents is selected, the central processing unit 8 starts replaying the corresponding content. In this processing, when the user selects the music content, the central processing unit 8 displays the feeling expression character, the selection button B1 of the music content, and the selection button BB1 of the content selected by the user at the top left end of the display screen, and displays details of the content and a date stored in the in-vehicle device 1. Thus, the central processing unit 8 can easily confirm which tune the user is now listening to. By selecting the buttons B1, BB1, the replay of the content is stopped, and the display is switched to the high order display screen corresponding to each button B1, BB1 (FIG. 4 and FIG. 19).

In this display screen, a jacket of the content is displayed at the center, and a symbolized staff notation is displayed behind the jacket. The central processing unit 8 thus allows the user to recognize the content in replay also by the displays of the symbolized staff notation and the jacket.

On this display screen, a button BA1 for instructing to turn on/off DSP, volume operating buttons BA2, BA3, and operating buttons BA4 to BA6 for starting replay, pausing, and stopping replay are displayed at the bottom. The central processing unit 8 switches processing of the contents in response to the operations of the buttons BA1 to BA5. Between the volume operation buttons BA2, BA3, continuous circles indicate a current volume. Thus, the central processing unit 8 detects and displays the emotions by the vehicle's virtual feelings even in the display of the music content replay.

Figure 20:
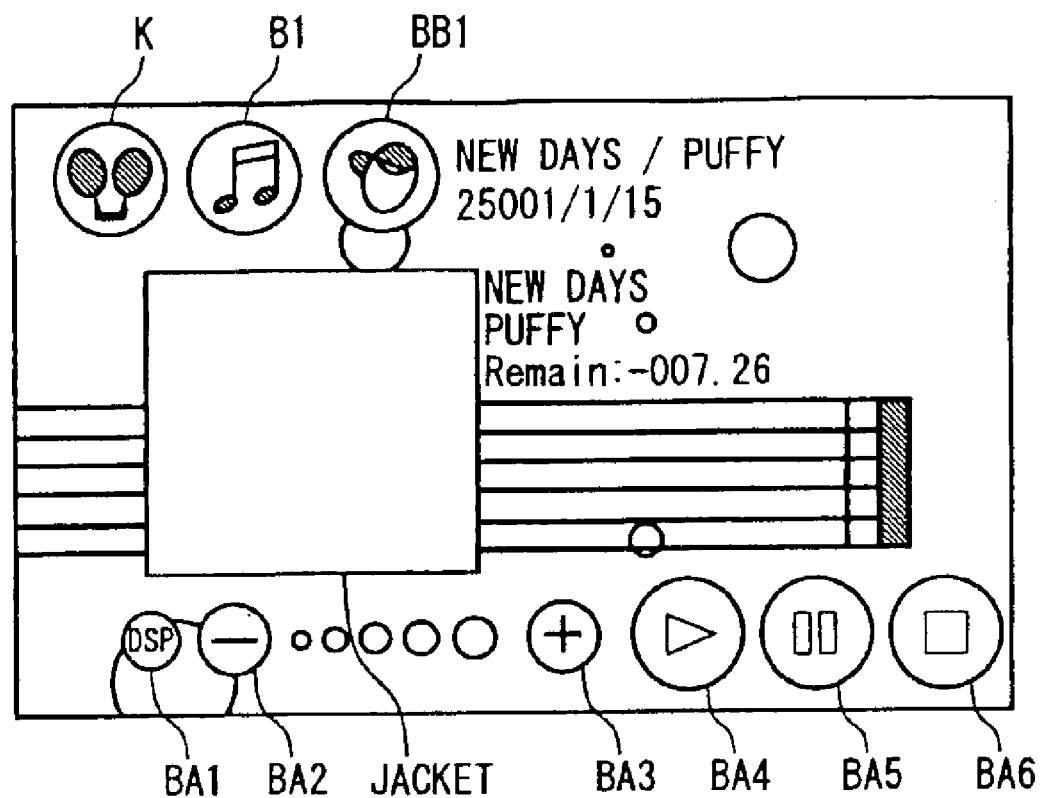
FIG. 20 is a plan view of a replay screen of a music content.
Figure 21:
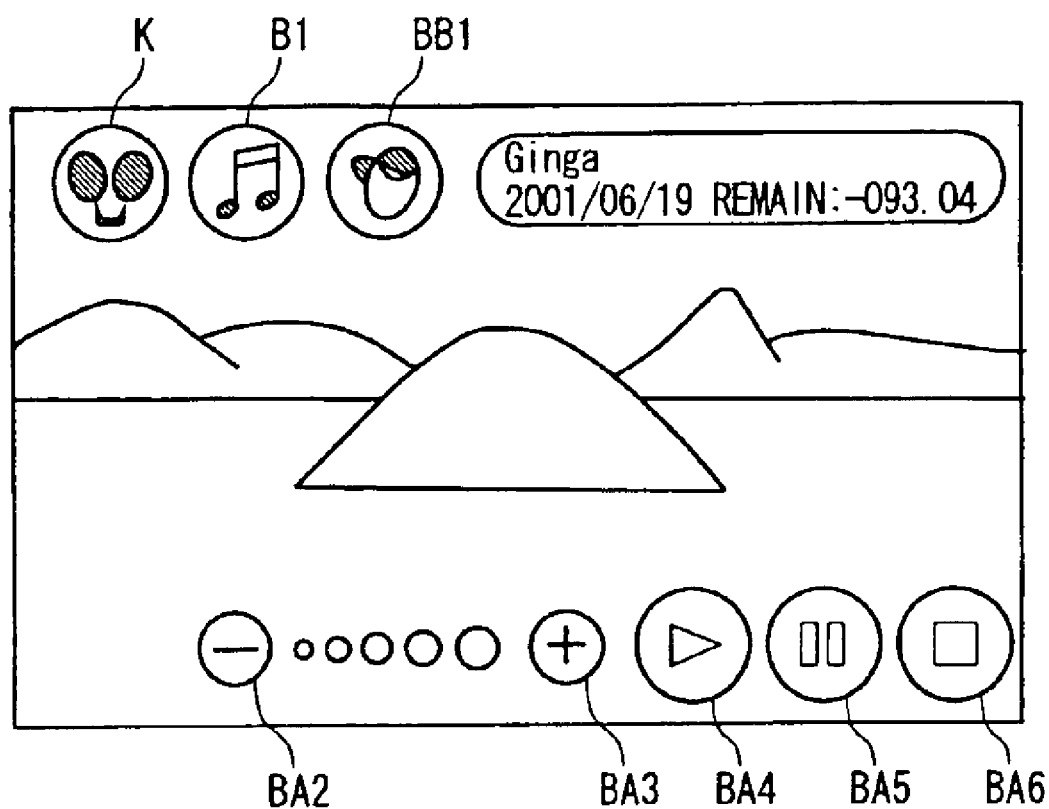
FIG. 21 is a plan view of a replay screen of a movie content.

FIG. 21 is a plan view of a display screen when the movie content is selected. In this case, the display screen is formed similarly to the display screen of the music content except that pictures of the movie content are displayed, that the button BA1 for instructing to turn on/off of DSP is omitted, and that remaining time is indicated together with the content name instead of the background display in the replay of the above described music content in FIG. 20. Thus, in the in-vehicle device 1, the user can enjoy the music content and the movie content by unified operations.

When the button B3 is selected, the central processing unit 8 displays the information content of a travel guide, a gourmet guide, or the like. When displaying a still image content, the central processing unit 8 displays page feed buttons in positive and negative directions corresponding to the content instead of the operation buttons of replay or pause.

When the direction button B3 is operated in the basic display screen, the central processing unit 8 switches the display to a navigation screen like a conventional car navigation device. This display includes the speech recognition processing button B5 displayed on the basic display screen.

Figure 22:
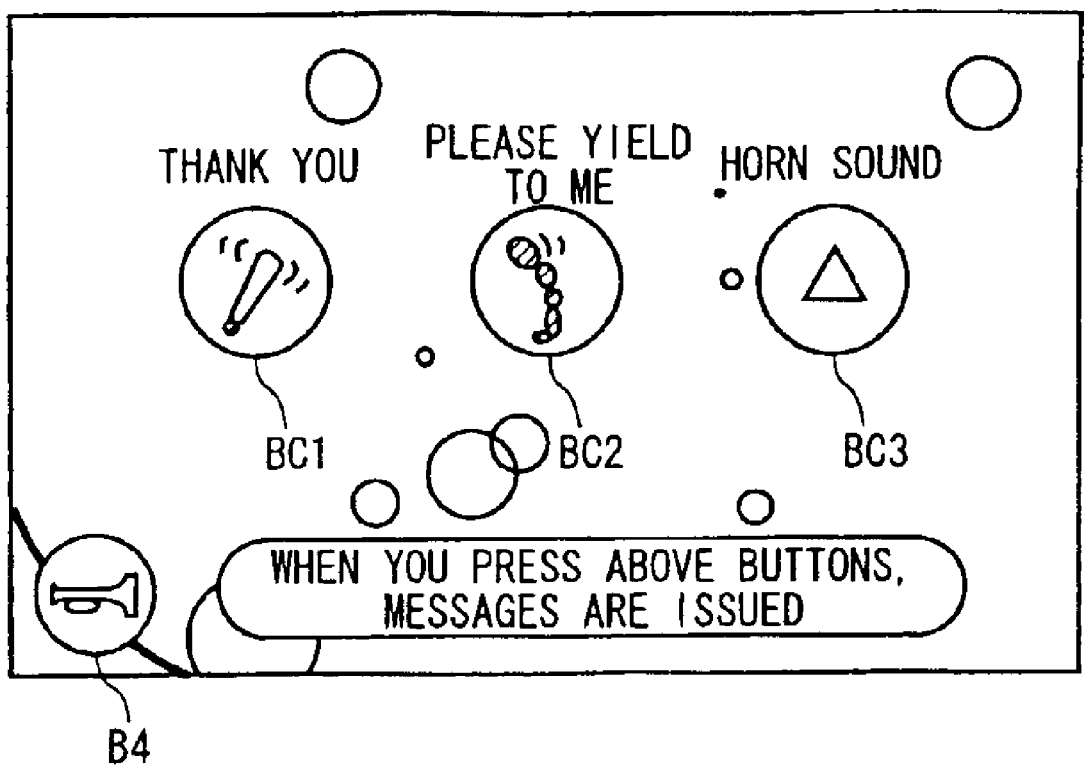
FIG. 22 is a plan view of a menu screen of a horn.

FIG. 22 is a plan view of a display screen when the horn button B4 is operated. In this display screen, the horn button B4 is displayed at the bottom left corner on the screen, and the button B4 is operated to switch the display to the original basic screen (FIG. 4). The horn button B4 has an indication of an arc like the indication on the original basic screen, which allows the user to recognize a hierarchical relationship of the menu.

This display screen includes three buttons BC1 to BC3 laterally in line. The left end button BC1 has an indication of a symbol showing a bar-like warning light shaken, and when pressed, issues a message sound "Thank you" outside the car by the inter-vehicle communication. The central button BC2 has an indication of a symbol showing a bowing person, and when pressed, issues a message sound "Please yield to me". The right end button BC3 has an indication of a symbol showing a triangular display plate that is a warning plate, and when pressed, issues a horn sound.

The display screen includes indications by text of the sounds issued by the buttons above the buttons BC1 to BC3, and of an operating manner of the buttons at the bottom. The central processing unit 8 performs processing corresponding to the operations of the buttons BC1 to BC3 in this display screen.

When the button B5 having the indication of the microphone is operated in the basic display screen, the central processing unit 8 activate the speech signal processing means 5 while the button B5 is continuously pressed. Thus, the central processing unit 8 allows the user to input various speech instructions in the display screen by operating the button B5 having the indication of the microphone.

In this embodiment, the speech instructions allows display of a setup screen of each seat, an air conditioner setting screen, a room lamp setting screen, display switching to the basic screen where the display of the content selection buttons B1 to B3 is stopped, a driving evaluation screen, or the like. The setup screen of each seat is a screen for setting a person sitting on each seat, and in the in-vehicle device 1, setting the setup screen causes processing of the speech signal processing means 5 to be switched depending on persons sitting on each seat, thus performing processing appropriate for the person sitting on each seat. The air conditioner setting screen and a room lamp setting screen are display screens for setting the air conditioner and the room lamp, and in the in-vehicle device 1, setting by the display screen is communicated to a controller of the vehicle body to set an interior temperature, or the like and to switch interior air circulation.

Figure 23:
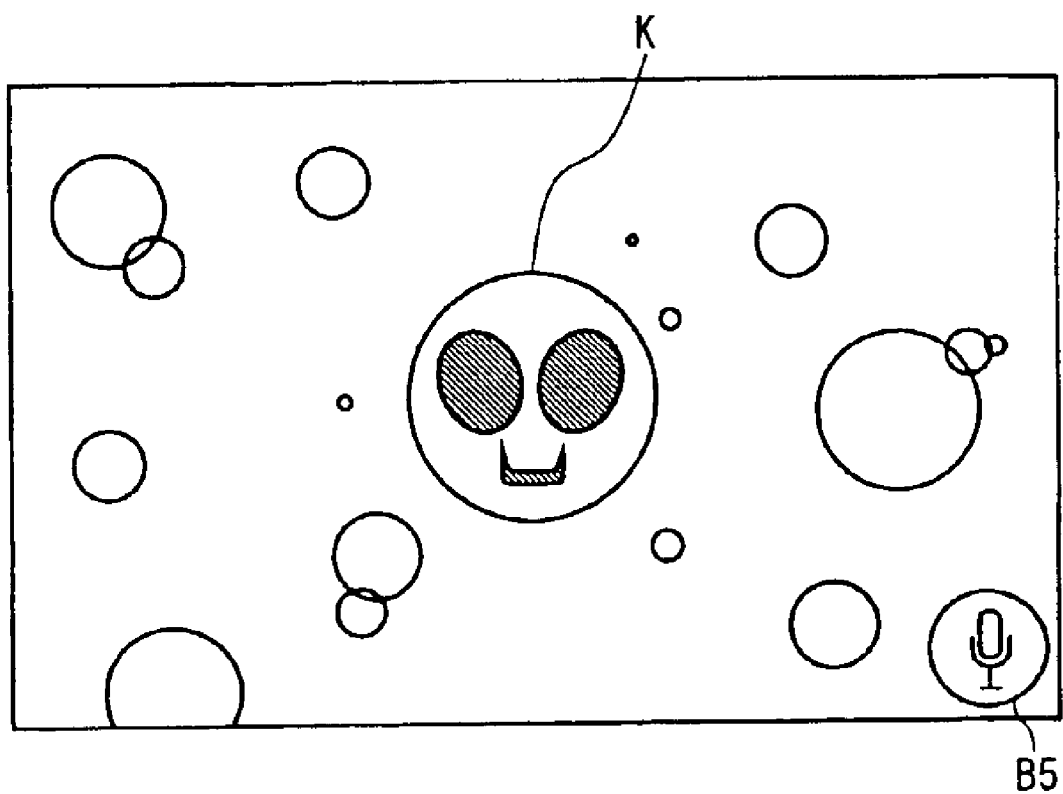
FIG. 23 is a plan view of a basic screen without a content menu.

FIG. 23 is a plan view of the basic screen where the display of the buttons B1 to B3 is stopped. When the speech signal processing means 5 receives a speech recognition result of "menu off", the central processing unit 8 displays this display screen instead of the display screen in FIG. 4. When the speech signal processing means 5 receives a speech recognition result of "menu on" with the display screen in FIG. 23 displayed, the central processing unit 8 switches the display screen to the basic display screen in FIG. 4.

In this basic screen, the character's face K expressing the virtual feeling is displayed at the center of the screen in an enlarged manner, and the background is displayed similarly to the display screen in FIG. 4. The microphone button B5 is displayed at the bottom right corner on the display screen. Thus, the in-vehicle device 1 can communicate the vehicle's virtual feeling to the user even when the contents are not required.

Figure 24:
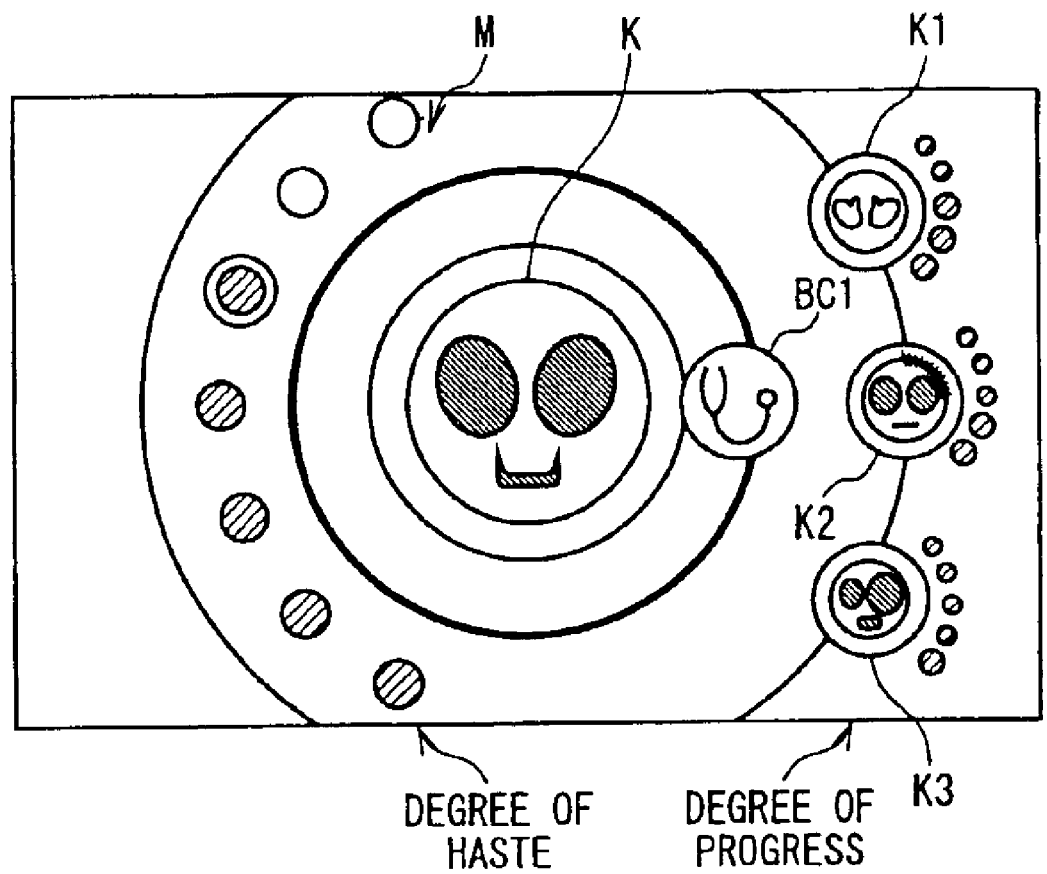
FIG. 24 is a plan view of a driving evaluation screen corresponding to a display screen in FIG. 23.

FIG. 24 is a plan view of a display screen that indicates a degree of haste when the user instructs to display the driving evaluation screen in the basic screen where the display of the buttons B1 to B3 is stopped, or in the above described basic screen in FIG. 4. In this display screen, the character's face K expressing the virtual feeling is displayed at the center of the screen in an enlarged manner, and circular traces are displayed concentrically with the outline of the character's face K. The outermost trace is broken at the top and the bottom of the screen such that the trace is divided into right and left sides with the character's face K at the center. In this display screen, indications K1 to K3 that indicate degrees of progress in driving are displayed on the right trace thus divided, and a button BC1 having a symbol of a stethoscope is displayed inside the indications K1 to K3. An indication M showing the degree of haste is displayed inside the left trace.

The central processing unit 8 averages and records the feeling level detected for each unit driving time, and detects the degree of haste in driving over a long period. For the indication M of the degree of haste, small circles are placed inside and along the trace of the arc, and the central processing unit 8 switches indication colors of the continuous circles depending on the degrees of haste thus detected. The continuous circles thus indicate the degree of haste over a long period. The circle corresponding to the degree of haste thus detected and the character's face K inside are connected by a line to indicate the degree of haste by the character's facial expression. Therefore, the in-vehicle device 1 can determine good or bad driving at each instant by the character's facial expression on the basic screen, and can determine good or bad driving over a long period by the display of the character in FIG. 24.

The central processing unit 8 determines the user's driving skill in terms of three factors of safety driving—"skill", "rule", and "prediction" by processing of accumulating the information detected by the vehicle handling detecting means 2 and the vehicle condition detecting means 4, and processing of accumulating the feeling level and the physical fitness level. When a value of the accumulated feeling level is high, it can be determined that "skill" is superior. When it is determined by road information obtained from the GPS system that a traveling speed is observed, or when the driver always wears a seat belt during driving, it can be determined that the driver observes the "rule". It can be also determined whether the driver has superior "prediction", by frequency of operations of "hard braking", "abrupt steering", or the like.

The central processing unit 8 converts the user's driving skill into numbers in terms of the three factors—"skill", "rule", and "prediction" by these criteria of determination. The central processing unit 8 sets the character's facial expressions by the values converted into numbers, and displays the characters on the indications K1 to K3 of the degrees of progress in driving. Small circles are continuously displayed along the outlines of the indications K1 to K3 at their peripheries, and indication colors of the continuous circles depend on the values of the skills. In this embodiment, the driver's driving skill is also communicated by the character's facial expression.

When the button BC1 of the stethoscope is operated, the central processing unit 8 switches the display mainly of the degree of haste to the display mainly of the driver's driving skill. This display is similar to the display in FIG. 24, but in this case, the button of the stethoscope is displayed on the side of the degree of haste. When the user presses any button other than the button BC1 of the stethoscope in these two display screens, the central processing unit 8 switches the display screen to the original display.

Figure 25:
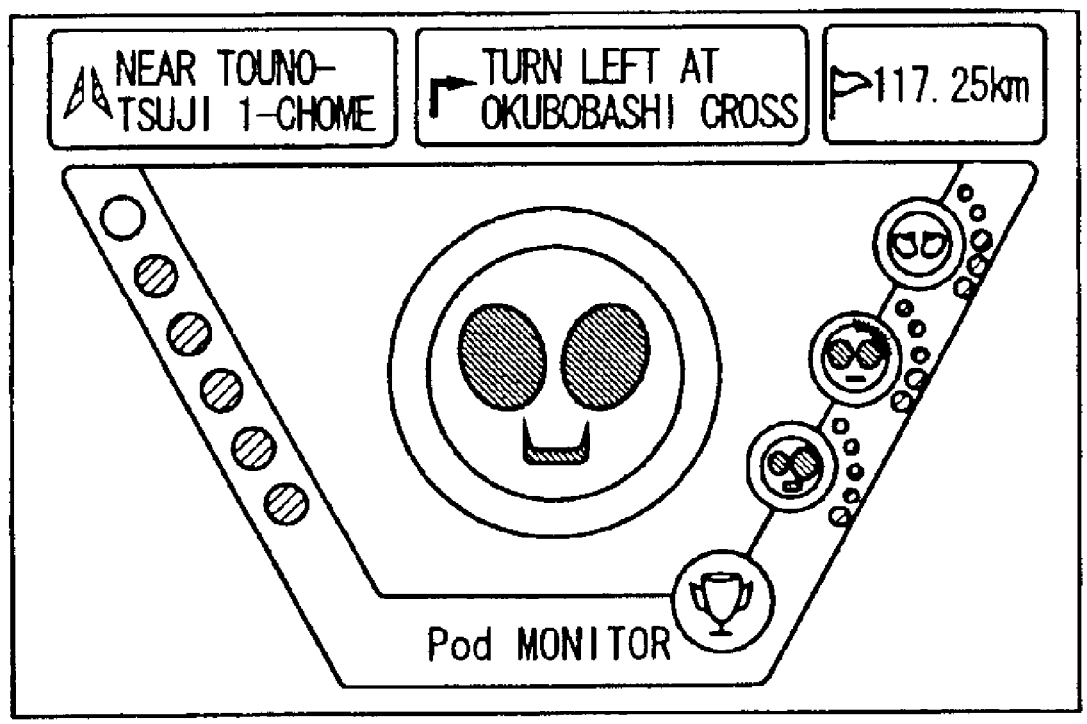
FIG. 25 is a plan view of a driving evaluation screen moved from a navigation screen.
Figure 26:
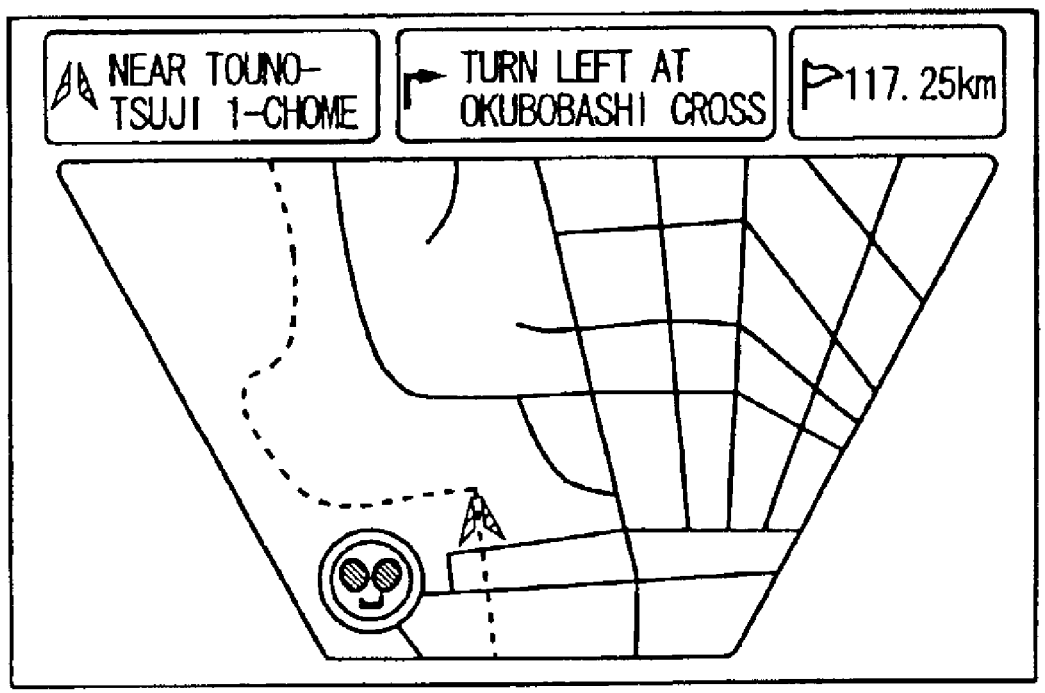
FIG. 26 is a plan view of a navigation screen.

FIG. 25 is a plan view of a display screen of the degree of haste when the user instructs to display the driving evaluation screen in a car navigation screen. As shown in FIG. 26 in contrast with FIG. 25, in this embodiment, a map is displayed in a trapezoidal display area with a shorter lower side, a current position and a traveling direction are indicated by arrows on the map, and a route is shown by a line of a different color, in processing of the car navigation. Balloons above an upper side of the display area indicate by text the current position, a next target position, and a distance to a destination.

In the driving evaluation screen (FIG. 25), the display area of the map has a frame with a certain width, and on the right and left sides of the frame, the degree of haste and the driving skill are displayed, respectively. This display is similar to the evaluation screen in FIG. 24 except that continuous circles indicating the degree of haste are displayed within the left frame, that the character's faces indicating "skill", "rule", and "prediction" are displayed on an inner boundary of the right frame, and that the a symbol of a cup is displayed on the driving skill side.

The in-vehicle device 1 communicates the driving evaluation during car navigation so as not to damage an atmosphere in car navigation, that is, so as to provide a good understanding of direction to the user.

(1-2) Operation of the First Embodiment

According to the above described configuration, in the in-vehicle device 1 (FIGS. 1 and 2), the vehicle handling detecting means 2 detects the user's operation of the vehicle, and the vehicle condition detecting means 4 detects the vehicle's behavior, and the environment around the vehicle. In the in-vehicle device 1, the central processing unit 8 processes such information, and displays user's handling of the vehicle by the virtual feelings on the assumption that the vehicle has a personality (FIG. 4 to FIG. 18).

Specifically, when the driver 3 drives violently, it can be projected that the vehicle feels uncomfortable if the vehicle has feelings. Thus, in such a case, the vehicle feels angry, sad or tired in its virtual feelings. On the other hand, when the driver 3 drives gently and calmly, it can be projected that the vehicle feels comfortable, pleased or cheerful in its virtual feelings.

In the in-vehicle device 1, the central processing unit 8 displays the virtual feelings on the display unit 7 by the predetermined character's facial expressions (FIGS. 4 to 18), and the vehicle situations are communicated to the user via the vehicle's feelings. Thus, in this embodiment, the vehicle situation can be properly communicated to the driver.

Specifically, direct advice to the driver such that "Sudden starts and sudden stops occur too often" or "The speed is too high" may irritate or annoy the driver and sometimes causes his/her resistance. However, as in this embodiment, if the handling of the vehicle is determined by the virtual feelings on the assumption that the vehicle has a personality, and the feelings are expressed by the character's facial expressions, the user looks back his/her behavior while thinking "why the character is angry", or "what I did to irritate the character". That is, the user analyzes and evaluates his/her behavior.

This causes the driver to look back the handling of the vehicle without irritating or annoying the driver, allowing the vehicle situation to be properly communicated.

In actual person-to-person communications, to call a partner's attention, people sometimes provide direct feedback about uncomfortable points by speaking or by expressing feelings instead of speaking. In this case, the partner looks back his/her behavior while thinking "why he/she is angry", or "what I said to irritate he/she", and analyzes and evaluates his/her behavior.

As in this embodiment, if the user's handling of the vehicle is expressed by the virtual feelings on the assumption that the vehicle has a personality, a person-to-car relationship can be established as if the car had an equal personality to the driver, and this provides the driver with feelings such that "why the car is angry", "why the car is crying", or "why the car is pleased". This can provide the driver with the opportunity to look back his/her driving or various operations.

Generally, drivers are careful about not annoying the partner, thus if the driver is caused to look back various operations, the driver's driving manner, driving skill, and risk prediction skill can be improved. This improves the driving skill without stress and prevents accidents.

The car having the feelings can provide the driver with an atmosphere as if the driver were making communication with a creature such as a pet. In such communication, people sometimes enjoy annoying the partner for amusement in contrast with the above. Thus, this embodiment causes the driver to feel an attachment to the car, and provides enjoyable driving compared to the conventional cases. Simply evaluating and communicating the driving skill causes no communication with the car, and does not provide such enjoyable driving.

According to this embodiment, the driver can not only use the vehicle as simple means of transportation, but also feels an attachment to the vehicle as a partner or a pet. Since the vehicle feels pleased when the owner fills the car with gasoline or washes the car, the owner also feels pleased and a greater attachment to the car.

Together with the character's facial expression, the background color changes, and this change in color also allows the user to recognize the vehicle's virtual feeling easily and through intuition. This ensures communicating the vehicle situation to the user even when the user concentrates on driving.

The in-vehicle device 1 performs data processing of the vehicle operation information detected by the vehicle handling detecting means 2 and the vehicle behavior information detected by the vehicle condition detecting means 4 to generate the feeling level indicating the user's degree of haste and the physical fitness level of the personified vehicle's physical fitness converted into numbers, and to generate the virtual feelings by changes in the feeling level and the physical fitness level on the preset characteristic curves (FIG. 3). Thus, this embodiment can detect the vehicle's feelings by simple processing.

The in-vehicle device 1 determines the operation information and the behavior information by the standard value recorded in the predetermined recording means to generate the feeling level, thus determining the driver's driving operation by an average driving skill specified by the standard value to communicate the determination. Therefore, the driver can determine his/her driving skill objectively and use the determination to improve his/her driving skill.

The in-vehicle device 1 detects the feeling level for each predetermined unit driving time, and expresses the vehicle's feeling at each time, and records the feeling level. The records are averaged, and then the degree of haste in driving over a long period is detected. The user's driving skill is determined in terms of the three factors of safety driving—"skill", "rule", and "prediction" by processing of accumulating the information detected by the vehicle handling detecting means 2 and the vehicle condition detecting means 4, and processing of accumulating the feeling level and the physical fitness level.

In the in-vehicle device 1, the user's speech instruction causes the degree of haste and the driving skill thus detected to be displayed instead of the character's facial expression with the feeling, or displayed in the car navigation screen (FIGS. 25 and 26). Thus, by comparing with the driving skill at each time, a driving skill over a long period can be determined.

The degree of haste and the driving skill are displayed by the character's facial expressions, so that a user interface familiar to the user and further a user interface that is unified with the driving skill at each time allow communication of the driving skill over a long period.

The operation information or the like is obtained by output of the sensors placed in the vehicle, thus the system may have a simple configuration.

(1-3) Advantage of the First Embodiment

According to the above described configuration, the user's handling of the vehicle is expressed by the virtual feelings on the assumption that the vehicle has a personality, and the virtual feelings are displayed by the predetermined character's facial expressions, thus allowing the vehicle situation to be properly communicated to the driver.

The operation information and the vehicle behavior information are processed to generate the feeling level indicating the user's degree of haste and the physical fitness level of the personified vehicles physical fitness converted into numbers, and to generate the virtual feelings by changes in the feeling level and the physical fitness level on the preset characteristic curves. Thus, the virtual feelings can be generated by simple processing.

At this time, the operation information and the behavior information are determined by the standard value recorded in the predetermined recording means to generate the virtual feelings, thus providing the user with the opportunity to look back his/her driving based on the average driving skill specified by the standard value.

The operation information is obtained by the output of the sensors placed in the vehicle, so that the series of processing steps can be performed effectively using the vehicle configuration, thus the configuration of the in-vehicle device can be simplified.

The changes in the background color together with the character's facial expression allow proper communication of the vehicle situation to the driver.

The user's driving skill is determined based on the operation information and the behavior information, and the determination result is displayed by the character's facial expression that indicates the driving skill at each time, so that the driving skill over a long period can be communicated to the user by the familiar user interface unified with the driving skill at each time.

(2) Second Embodiment

Figure 27:
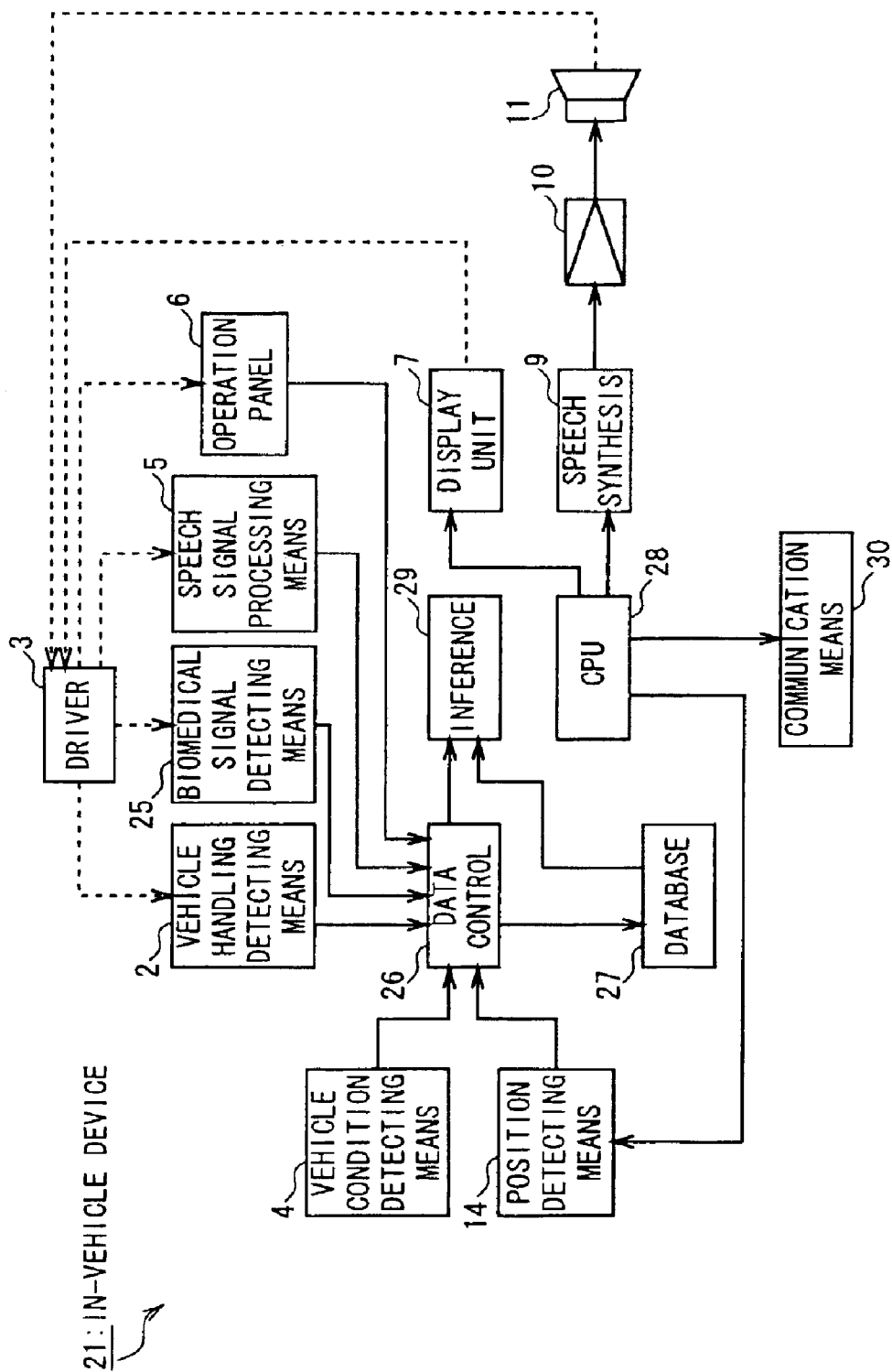
FIG. 27 is a block diagram of an in-vehicle device according to the second embodiment of the invention.

FIG. 27 is a block diagram of an in-vehicle device according to a second embodiment of the invention. In this in-vehicle device 21, the same configurations as the in-vehicle device 1 in FIG. 2 are denoted by corresponding reference numerals, and overlapping descriptions will be omitted.

In this embodiment, biomedical signal detecting means 25 detects various reactions on a body of a driver 3 and outputs the detection result. Specifically, the biomedical signal detecting means 25 detects and outputs heart rate, blood pressure, sweat rate, or the like of the driver 3. This allows the in-vehicle device 21 to detect a degree of tension of the driver 3.

A data control unit 26 accumulates operation information detected by vehicle handling detecting means 2, behavior information detected by vehicle condition detecting means 4, and various kinds of information detected by the biomedical signal detecting means 25, in recording means to constructs a database 27.

An inferring unit 29 calculates a standard value used for generating the feeling level and the physical fitness level by the records of the database 27. In this embodiment, processing by the central processing unit 28 based on the standard value causes virtual feelings as in the first embodiment to be formed and displayed on a display unit 7.

Thus, in this in-vehicle device 1, the vehicle's feelings are generated based on each driver's personality, and the driver's vehicle operation can be determined in view of each driver's personality. Specifically, some users perform various operations promptly, and some users perform various operations relatively slowly. If the drivers operations are determined without considering such difference among the users, the users who perform various operations promptly are determined to be always in haste, and the users who perform various operations relatively slowly are determined to have good driving skills.

However, as in this embodiment, by accumulating the operation information and the behavior information by user's past driving and generating the standard value of the feeling level generation by accumulating the information, it can be determined that even the user who performs various operations promptly is in haste when he/she is actually in haste, and that even the user who performs various operations relatively slowly has good a driving skill when he/she actually drives smoothly. Therefore, the user's vehicle operation can be properly determined with the user's personality reflected.

The inferring unit 29 averages the records of the database 27 to detect an average of the information detected by the biomedical signal detecting means and to process output information of the biomedical signal detecting means 25 obtained via the data control unit 26 by the average. Thus, the inferring unit 29 infers driver's conditions, and detects degrees of "sleepiness", "excitement", "tiredness", or the like.

The central processing unit 28 detects abnormal handling of the vehicle by the user in accordance with various kinds of information thus obtained by the inferring unit 29, and based on the detection result, calls a user's attention by a direct message or a horn sound instead of the display of the character's facial expression. When operations such as hard braking or abrupt steering often occur, it is supposed that the user is in an abnormally excited condition, or abnormally in a hurry. In this case, it can be determined that there is a high risk of accident, and it is considered that direct communication of the risk serves to prevent an accident regardless of the driver's feeling. Thus, in this embodiment, in such a case, the central processing unit 28 calls the user's attention by the direct message or the horn sound instead of the display of the character's facial expression to prevent accidents.

When it is determined that the driver 3 feels abnormally sleepy, excited, or tired, by the degrees of "sleepiness", "excitement", "tiredness", or the like obtained by the inferring unit 29 in addition to the information on driving, the central processing unit 28 performs processing that can avoid such conditions. Specifically, when the driver is sleepy or tired, the central processing unit 28 detects a near resting place via communication means 30, and sets the resting place as a destination of a navigation system to direct the user to the place for providing a rest. When it is determined that the user is excited, the central processing unit 28 provides the user with music that may calm the user down by searching a music content recorded in the recording means, or by downloading a music content via the communication means 30.

In the in-vehicle device 21, the data control unit 26 processes speech recognition results received via speech signal processing means 5 to record personal information included in user's conversation in the database 27, and use the information when calming the user down. In this case, it can be considered that that user's favorite music is determined by frequency of listening to music by the user, age, hobby, accomplishments of the user, or the like, and provided to the user.

According to a configuration in FIG. 27, by accumulating the operation information and the behavior information by user's past driving and generating the standard value by accumulating the information to generate the virtual feelings, the user's driving can be determined with each user's personality reflected. Thus, the vehicle including the in-vehicle device 21 can be provided with feelings as a partner corresponding to the driver 3, thus making the vehicle more familiar.

Based on the operation information and the behavior information, the abnormal handling of the vehicle by the user is detected, and based on the detection result, a warning is issued instead of the display of the character's facial expression to ensure prevention of accidents.

(3) Other Embodiments

In the above described embodiment, expressing emotions simply by the criteria of the feeling level and the physical fitness level has been described, but the invention is not limited to this, and various criteria of determination can be further provided. Specifically, frequency of abnormal behaviors or unnecessary behaviors is divided by the time when the behavior occurs to obtain a smooth level that directly indicates smoothness in driving. This smooth level may be added to the criteria of determination. Frequency of sudden operations is divided by a traveling distance to obtain a safety level that indicates a degree of safe ride. This safety level may be added to the criteria of determination. Frequency of acceleration variation is divided by the traveling distance to obtain a ride comfort level that indicates a degree of ride comfort. This ride comfort level may be added to the criteria of determination. User's traveling time is divided by non-traveling time to obtain a casual level that indicates frequency of what is called casual driving. This casual level may be added to the criteria of determination. Frequency of maintenance such as an oil change is divided by a traveling distance between times of maintenance to obtain a maintenance level that indicates a degree of maintenance. This maintenance level may be added to the criteria of determination. These criteria of determination may be applied instead of the feeling level and the physical fitness level.

In the above described embodiment, generating the feelings simply by tracing the characteristic curves has been described, but the invention is not limited to this, and the feelings may be generated by complex processing using a neutral network, or the like.

In the above described embodiment, it has been described that when the user's vehicle operation is determined to be abnormal, the warning is directly issued to the user instead of the character's facial expression, but the invention is not limited to this, and the warning may be directly issued to the user in addition to the character's facial expression.

In the above described embodiment, it has been described that when an abnormal condition of the driver such as excitement is detected, a stimulus by music is provided to the user to avoid the abnormal condition, but the invention is not limited to this, and a stimulus to calm the user down may be provided to the user also when the abnormal vehicle operation by the user is detected. In this case, supposed methods include relaxing by music as described above, relaxing by aroma in the car, providing the rider other than the driver with a picture of a landscape or the like to calm the rider down and relax the driver, lowering temperature of an air conditioner to calm the driver down, and calming the driver down by vibration of a seat. It can be also supposed that a response to an operation amount that is an input value relative to the vehicle is forced to change to prevent accidents.

In the above described embodiments, expressing the vehicle's feelings by the cheerful, angry, or sad expression has been described, but the invention is not limited to this, and a scared or mad expression may be used.

In the above described embodiments, expressing the vehicle's feelings simply by the facial expressions has been described, but the invention is not limited to this, and the feelings may be expressed also by voice. In this case, it can be supposed that voice including no words is generated such as of a famous robot in a movie.

In the above described embodiments, expressing the vehicle's feelings by the facial expressions of the predetermined character has been described, but the invention is not limited to this, and the character may grow with time. In this growth, the form of the character may change, or various data relating to driving such as the feeling level may be set as parameters to change a speed of growth. A size of the face may change such that the face becomes small for each dangerous operation, and in a more surprised condition, the feeling may be expressed together with a behavior such as jumping in the screen.

In the above described embodiments, expressing the feelings by one character has been described, but the invention is not limited to this, and characters may be switched by, for example, selecting contents.

Figure 28:
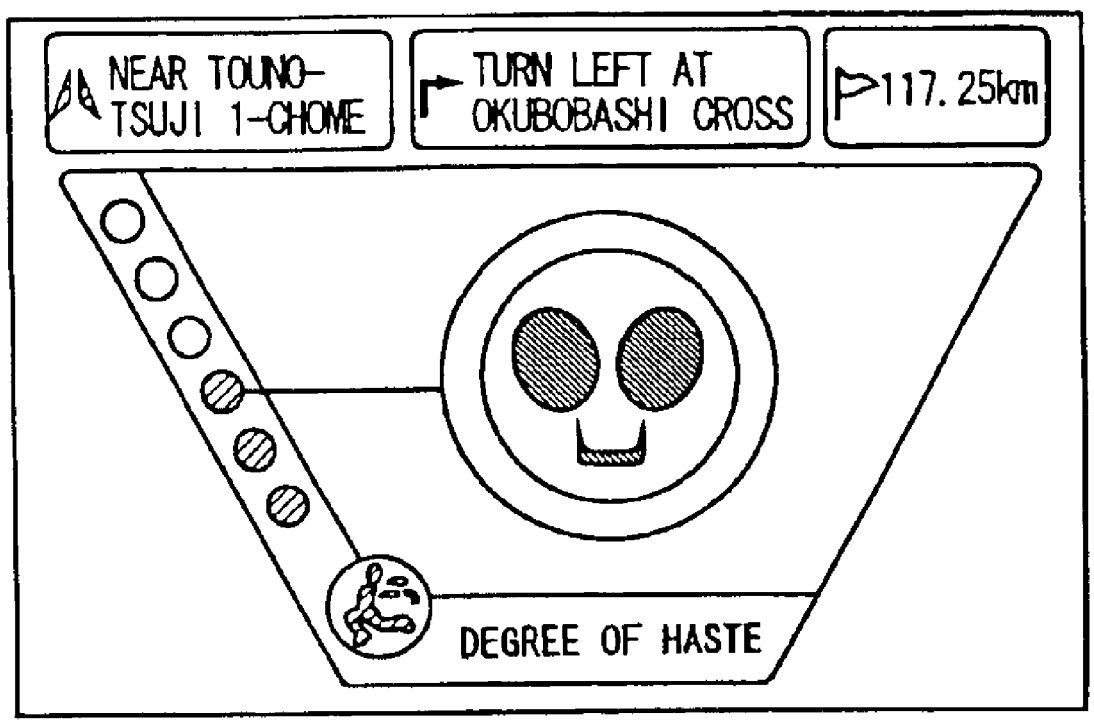
FIG. 28 is a plan view of a driving evaluation screen that mainly indicates a degree of haste.
Figure 29:
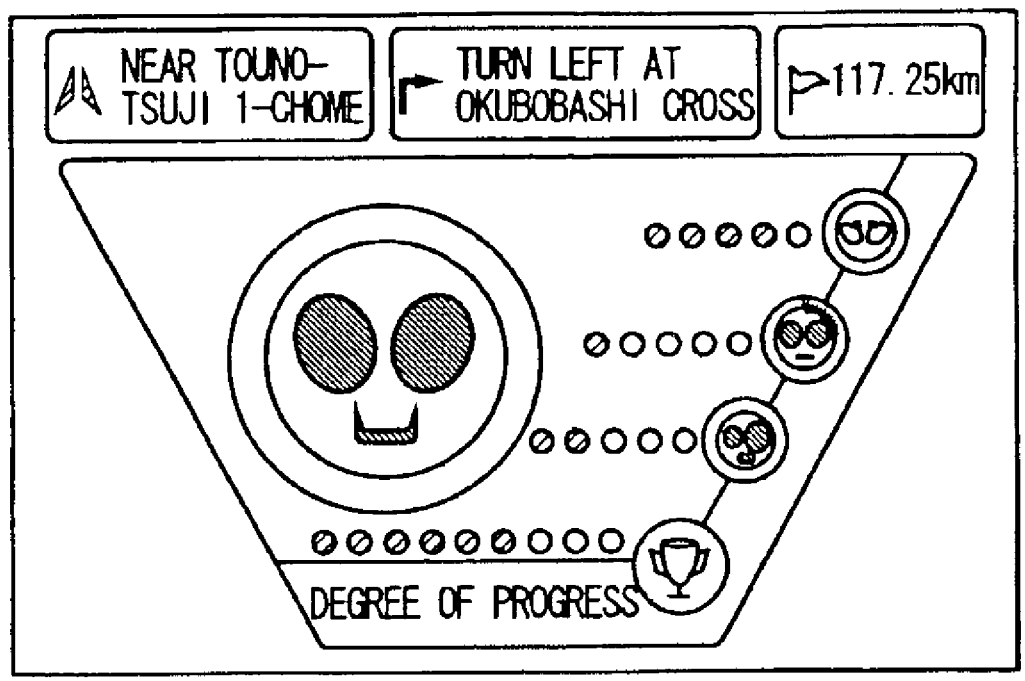
FIG. 29 is a plan view of a driving evaluation screen that mainly indicates a degree of progress.

In the above described embodiments, it has been described that the display of the driving skill includes both the degree of haste and the driving skill, but the invention is not limited to this, and the degree of haste and the driving skill may be displayed separately as shown in FIGS. 28 and 29.

In the above described embodiments, it has been described that the display of the driving skill includes the degree of haste indicated by the average of the past feelings, but the invention is not limited to this, and movement of the past feelings may be displayed in graph form.

In the above described embodiments, placing the display unit at each seat has been described, but the invention is not limited to this, and can be also applied to the case where the display units are placed collectively.

In the above described embodiments, it has been described that the operation information and the behavior information by the user's past driving are accumulated for use as criteria of generation of the feeling level, but the invention is not limited to this, and considering a case where a plurality of users use one car, the information may be accumulated for each user for use as the criteria of generation of the feeling level. In this case, the criteria of generation of the feeling level for the corresponding user may be derived with user verification by IC card or input of password to perform a series of processing steps. For such personal verification, biometrics information such as fingerprint, blood-vessel arrangement, voiceprint may be used.

In the above described embodiments, it has been described that the invention is applied to the in-vehicle device, but the invention is not limited to this, and may be applied to the vehicle itself. Further, instead of expressing the feelings by data processing in the vehicle, various data may be transmitted to a processing center by communication means, the feelings being detected by processing at the processing center, and then detection results of the feelings being received and displayed by the vehicle.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A vehicle information processing device mounted in a vehicle, comprising:
    operation information obtaining means for obtaining operation information of said vehicle obtained by detecting user's operation of said vehicle;
    behavior information obtaining means for obtaining behavior information obtained by detecting a behavior of said vehicle;
    virtual feeling generating means for expressing handling of said vehicle by said user, based on said operation information and said behavior information, by virtual feelings on the assumption that said vehicle has a personality; and
    facial expression generating means for displaying said virtual feelings by facial expressions of a predetermined character, wherein
    said virtual feeling generating means generates a physical fitness level that is physical fitness of said personified vehicle converted into numbers by said operation information and said behavior information, and generates said virtual feelings by changes in said physical fitness level.

2. A vehicle information processing device mounted in a vehicle, comprising:
    operation information obtaining means for obtaining operation information of said vehicle obtained by detecting user's operation of said vehicle;
    behavior information obtaining means for obtaining behavior information obtained by detecting a behavior of said vehicle;
    virtual feeling generating means for expressing handling of said vehicle by said user, based on said operation information and said behavior information, by virtual feelings on the assumption that said vehicle has a personality; and
    facial expression generating means for displaying said virtual feelings by facial expressions of a predetermined character, wherein
    said virtual feeling generating means generates a feeling level that is feeling of said user converted into numbers by said operation information and said behavior information, and generates said virtual feelings by changes in said feeling level.

3. A vehicle information processing device mounted in a vehicle, comprising:
    operation information obtaining means for obtaining operation information of said vehicle obtained by detecting user's operation of said vehicle;
    behavior information obtaining means for obtaining behavior information obtained by detecting a behavior of said vehicle;
    virtual feeling generating means for expressing handling of said vehicle by said user, based on said operation information and said behavior information, by virtual feelings on the assumption that said vehicle has a personality; and
    facial expression generating means for displaying said virtual feelings by facial expressions of a predetermined character, wherein
    said virtual feeling generating means generates at least a feeling level that indicates a degree of haste of said user and a physical fitness level that is physical fitness of said personified vehicle converted into numbers by said operation information and said behavior information, and generates said virtual feelings by changes in said feeling level and said physical fitness level on preset characteristic curves.

4. A vehicle information processing device mounted in a vehicle, comprising:
    operation information obtaining means for obtaining operation information of said vehicle obtained by detecting user's operation of said vehicle;
    behavior information obtaining means for obtaining behavior information obtained by detecting a behavior of said vehicle;

virtual feeling generating means for expressing handling of said vehicle by said user, based on said operation information and said behavior information, by virtual feelings on the assumption that said vehicle has a personality; and facial expression generating means for displaying said virtual feelings by facial expressions of a predetermined character, wherein said virtual feeling generating means determines said operation information and said behavior information by a standard value recorded in predetermined recording means to generate said virtual feelings.

5. The vehicle information processing device according to claim 4, further comprising data processing means for accumulating said operation information and said behavior information by past driving of said user to generate said standard value by accumulating said information.

6. The vehicle information processing device according to claim 5, wherein said data processing means accumulates said operation information and said behavior information to generate said standard value for each user.

7. A vehicle information processing device mounted in a vehicle, comprising:

operation information obtaining means for obtaining operation information of said vehicle obtained by detecting user's operation of said vehicle;

behavior information obtaining means for obtaining behavior information obtained by detecting a behavior of said vehicle;

virtual feeling generating means for expressing handling of said vehicle by said user, based on said operation information and said behavior information, by virtual feelings on the assumption that said vehicle has a personality; and facial expression generating means for displaying said virtual feelings by facial expressions of a predetermined character, wherein said device further comprises abnormal condition detecting means for detecting abnormal handling of said vehicle by said user, based on said operation information and said behavior information, and said device provides said user with a stimulus to calm said user down, based on a detection result by said abnormal condition detecting means.

8. A vehicle information processing device mounted in a vehicle, comprising:

operation information obtaining means for obtaining operation information of said vehicle obtained by detecting user's operation of said vehicle;

behavior information obtaining means for obtaining behavior information obtained by detecting a behavior of said vehicle;

virtual feeling generating means for expressing handling of said vehicle by said user, based on said operation information and said behavior information, by virtual feelings on the assumption that said vehicle has a personality; and facial expression generating means for displaying said virtual feelings by facial expressions of a predetermined character, wherein said device further comprises skill determining means for determining a driving skill of said user, based on said operation information and said behavior information, and said facial expression generating means displays a determination result by said skill determining means by said character's facial expression.

9. A vehicle comprising:

operation information obtaining means for detecting user's operation of the vehicle to obtain operation information of the vehicle;

behavior information obtaining means for detecting at least entire behaviors to obtain behavior information of said vehicle; virtual feeling generating means for expressing handling of said vehicle by said user, based on said operation information and said behavior information, by virtual feelings on the assumption' that said vehicle has a personality; and facial expression generating means for displaying said virtual feelings by facial expressions of a predetermined character, wherein said virtual feeling generating means generates a physical fitness level that is physical fitness of said personified vehicle converted into numbers by said operation information and said behavior information, and generates said virtual feelings by changes in said physical fitness level.

10. A vehicle comprising:

operation information obtaining means for detecting user's operation of the vehicle to obtain operation information of the vehicle;

behavior information obtaining means for detecting at least entire behaviors to obtain behavior information of said vehicle; virtual feeling generating means for expressing handling of said vehicle by said user, based on said operation information and said behavior information, by virtual feelings on the assumption' that said vehicle has a personality; and facial expression generating means for displaying said virtual feelings by facial expressions of a predetermined character, wherein said virtual feeling generating means generates a feeling level that is feeling of said user converted into numbers by said operation information and said behavior information, and generates said virtual feelings by changes in said feeling level.

11. A vehicle comprising:

operation information obtaining means for detecting user's operation of the vehicle to obtain operation information of the vehicle;

behavior information obtaining means for detecting at least entire behaviors to obtain behavior information of said vehicle; virtual feeling generating means for expressing handling of said vehicle by said user, based on said operation information and said behavior information, by virtual feelings on the assumption' that said vehicle has a personality; and facial expression generating means for displaying said virtual feelings by facial expressions of a predetermined character, wherein said virtual feeling generating means generates at least a feeling level that indicates a degree of haste of said user and a physical fitness level that is physical fitness of said personified vehicle converted into numbers by said operation information and said behavior information, and generates said virtual feelings by changes in said feeling level and said physical fitness level on preset characteristic curves.

12. A vehicle information processing method comprising:

an operation information obtaining step of detecting user's operation of a vehicle to obtain operation information of the vehicle;

a behavior information obtaining step of detecting a behavior of said vehicle to obtain behavior information of said vehicle;

a virtual feeling generating step of expressing handling of said vehicle by said user, based on said operation information and said behavior information, by virtual feelings on the assumption that said vehicle has a personality;

a facial expression generating step of displaying said virtual feelings by facial expressions of a predetermined character; and a step of generating a physical fitness level that is physical fitness of said personified vehicle converted into numbers by said operation information and said behavior information, and generating said virtual feelings by changes in said physical fitness level.

13. A vehicle information processing method comprising:

an operation information obtaining step of detecting user's operation of a vehicle to obtain operation information of the vehicle;

a behavior information obtaining step of detecting a behavior of said vehicle to obtain behavior information of said vehicle;

a virtual feeling generating step of expressing handling of said vehicle by said user, based on said operation information and said behavior information, by virtual feelings on the assumption that said vehicle has a personality;

a facial expression generating step of displaying said virtual feelings by facial expressions of a predetermined character; and a step of generating a feeling level that is feeling of said user converted into numbers by said operation information and said behavior information, and generating said virtual feelings by changes in said feeling level.

14. A vehicle information processing method comprising:

an operation information obtaining step of detecting user's operation of a vehicle to obtain operation information of the vehicle;

a behavior information obtaining step of detecting a behavior of said vehicle to obtain behavior information of said vehicle;

a virtual feeling generating step of expressing handling of said vehicle by said user, based on said operation information and said behavior information, by virtual feelings on the assumption that said vehicle has a personality;

a facial expression generating step of displaying said virtual feelings by facial expressions of a predetermined character; and a step of generating at least a feeling level that indicates a degree of haste of said user and a physical fitness level that is physical fitness of said personified vehicle converted into numbers by said operation information and said behavior information, and generating said virtual feelings by changes in said feeling level and said physical fitness level on preset characteristic curves.

* * * * *